(12) United States Patent
Muramoto et al.

(10) Patent No.: US 8,018,557 B2
(45) Date of Patent: Sep. 13, 2011

(54) RETARDATION COMPENSATING PLATE TO COMPENSATE RESIDUAL RETARDATION OF A LIQUID CRYSTAL PANEL, A COMPENSATOR, A LIQUID CRYSTAL DISPLAY DEVICE, AND A PROJECTION IMAGE DISPLAY APPARATUS HAVING THE SAME

(75) Inventors: Yutaka Muramoto, Miyagi (JP); Satoshi Sekino, Miyagi (JP); Hideki Terashima, Miyagi (JP); Tatsuya Harima, Miyagi (JP); Sachie Shoji, Miyagi (JP); Noriaki Doi, Miyagi (JP); Tokuhiro Morioka, Miyagi (JP)

(73) Assignee: Sony Corporation, Tokyo (JP)

( * ) Notice: Subject to any disclaimer, the term of this patent is extended or adjusted under 35 U.S.C. 154(b) by 1200 days.

(21) Appl. No.: 11/375,000

(22) Filed: Mar. 15, 2006

(65) Prior Publication Data
US 2006/0215091 A1 Sep. 28, 2006

(30) Foreign Application Priority Data

Mar. 15, 2005 (JP) ................. 2005-074136
Jun. 3, 2005 (JP) ................. 2005-163757
Mar. 9, 2006 (JP) ................. 2006-064965

(51) Int. Cl.
*G02F 1/1335* (2006.01)
(52) U.S. Cl. ..................... 349/119; 349/117
(58) Field of Classification Search ........... 349/117, 349/119
See application file for complete search history.

(56) References Cited

U.S. PATENT DOCUMENTS

| | | | |
|---|---|---|---|
| 6,593,985 B1 * | 7/2003 | Taira et al. | 349/119 |
| 6,829,026 B2 * | 12/2004 | Sasaki et al. | 349/118 |
| 6,853,424 B2 * | 2/2005 | Elman et al. | 349/117 |
| 7,211,304 B2 * | 5/2007 | Elman et al. | 428/1.3 |
| 7,436,476 B2 * | 10/2008 | Sharp et al. | 349/117 |
| 2002/0047968 A1 * | 4/2002 | Yoshida et al. | 349/117 |
| 2003/0128320 A1 * | 7/2003 | Mi et al. | 349/117 |
| 2004/0027520 A1 * | 2/2004 | Elman et al. | 349/117 |
| 2004/0080691 A1 * | 4/2004 | Mi et al. | 349/117 |
| 2005/0128391 A1 * | 6/2005 | Tan et al. | 349/117 |
| 2006/0055853 A1 * | 3/2006 | Murakami et al. | 349/117 |
| 2006/0164579 A1 * | 7/2006 | Yano | 349/117 |
| 2008/0266470 A1 * | 10/2008 | Muramoto | 349/8 |

FOREIGN PATENT DOCUMENTS

WO WO 2004/011970 A1 2/2004

OTHER PUBLICATIONS

Extended European Search Report issued Feb. 18, 2011 in European Patent Application No. 06729162.5.

* cited by examiner

*Primary Examiner* — David Nelms
*Assistant Examiner* — Charles Chang
(74) *Attorney, Agent, or Firm* — Oblon, Spivak, McClelland, Maier & Neustadt, L.L.P.

(57) ABSTRACT

A retardation compensator 40 for compensating for residual retardation of a liquid crystal panel 11 includes a retardation compensating plate 50 having birefringence. An in-plane retardation $R0c$ of the retardation compensating plate 50 and an in-plane retardation $R0p$ of the liquid crystal panel 11 satisfy a relationship of $1<R0c/R0p\leq10$, thereby allowing changes in the amount of compensated retardation among rotation angles occurring when the retardation compensating plate 50 is set with respect to the liquid crystal panel 11 to be confined within narrow limits. Therefore, the contrast can be adjusted readily, and variations in residual retardation among the individual liquid crystal panels 11 can be accommodated flexibly.

30 Claims, 17 Drawing Sheets

RETARDATION COMPENSATING PLATE 50

- 54 ANTIREFLECTION LAYER
- 53 BIREFRINGENT LAYER
- 51 SUPPORT
- 52 ANTIREFLECTION LAYER

50
- 54
- 55
- 53
- 51
- 52

| G | Rth[nm] | CR |
|---|---------|------|
| 1 | 124 | 4521 |
| 2 | 140 | 5156 |
| 3 | 180 | 6074 |
| 4 | 200 | 5828 |
| 5 | 270 | 4204 |
| 6 | 388 | 1926 |

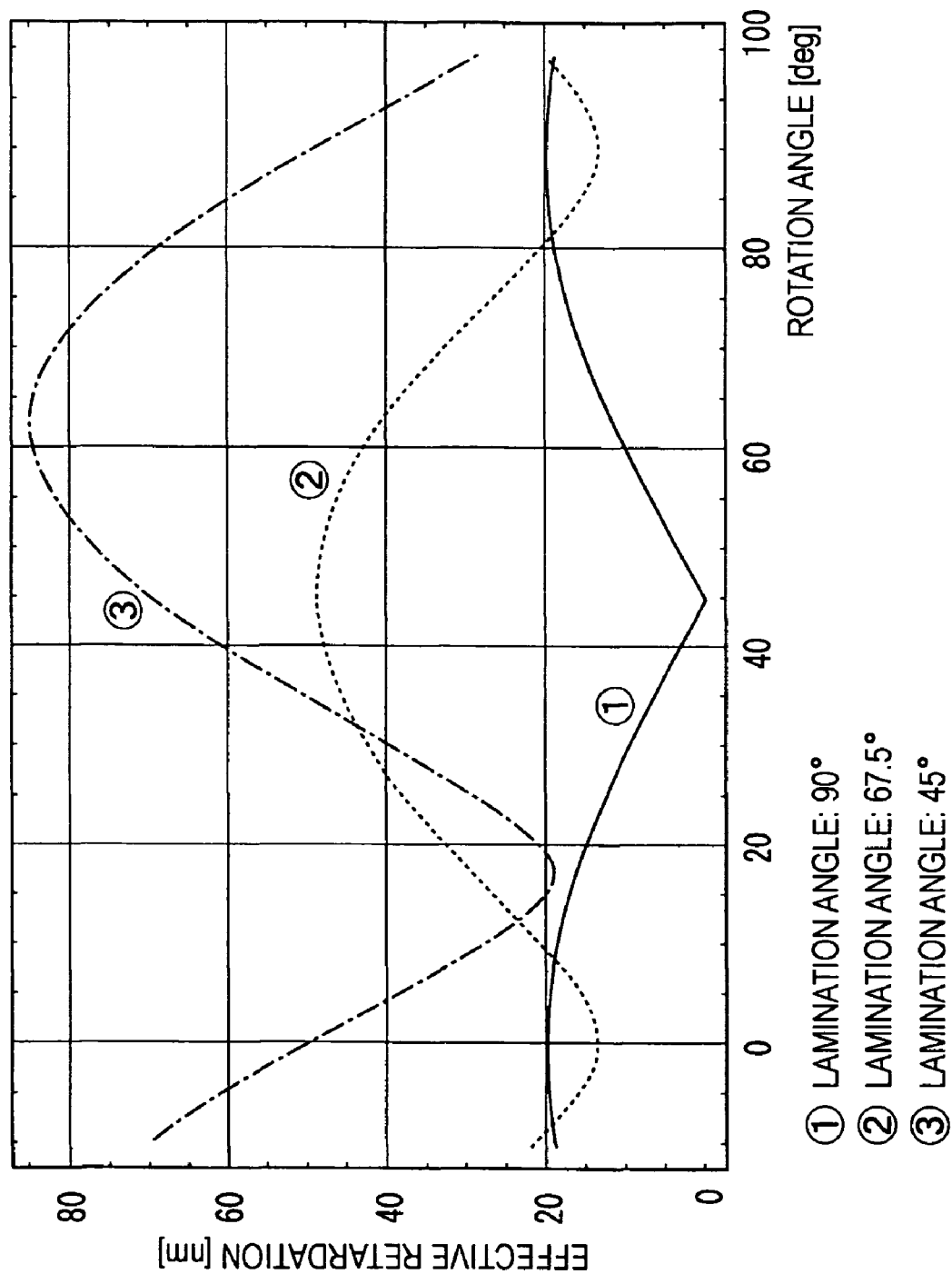

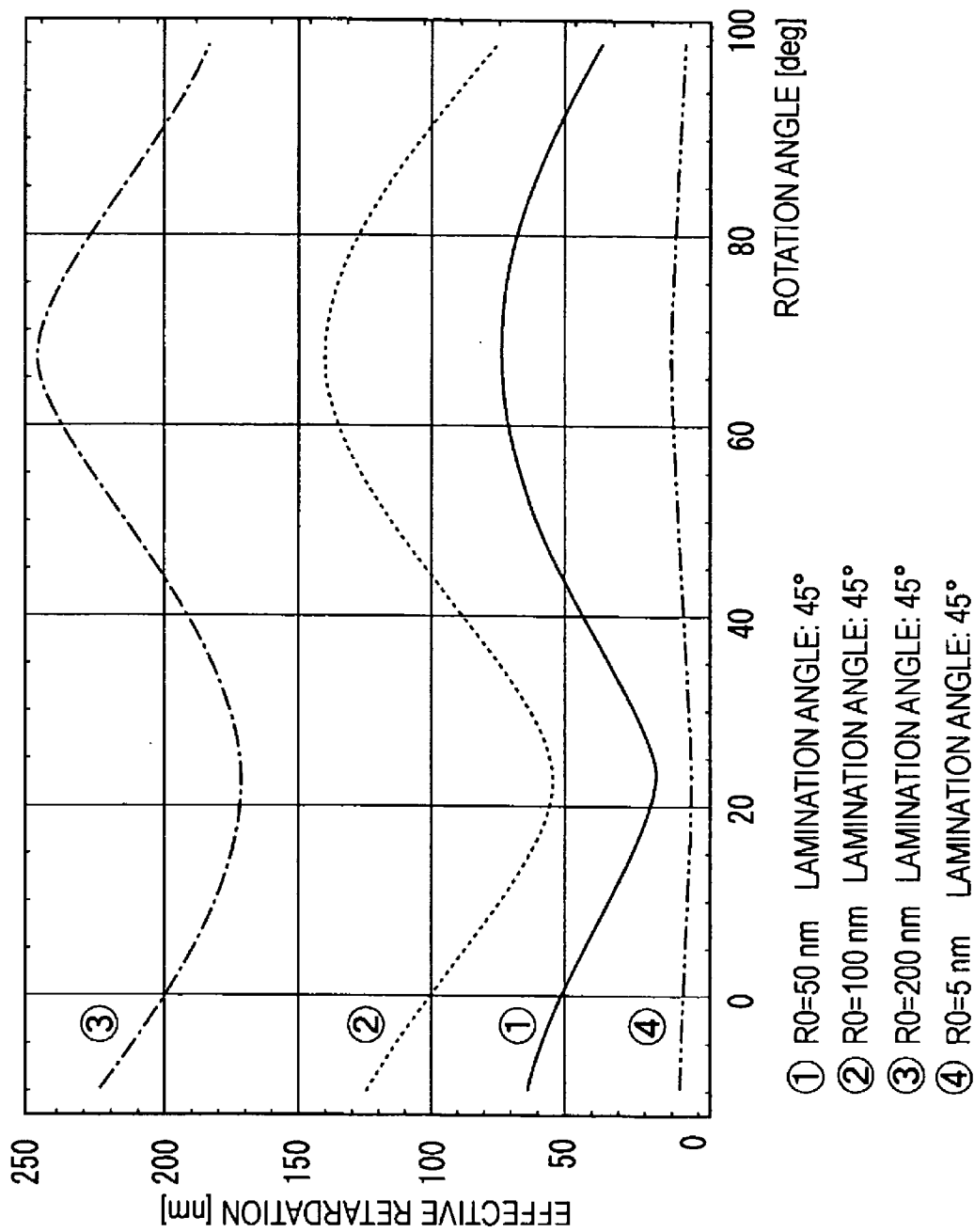

RETARDATION COMPENSATING PLATE TO COMPENSATE RESIDUAL RETARDATION OF A LIQUID CRYSTAL PANEL, A COMPENSATOR, A LIQUID CRYSTAL DISPLAY DEVICE, AND A PROJECTION IMAGE DISPLAY APPARATUS HAVING THE SAME

CROSS REFERENCES TO RELATED APPLICATIONS

The present invention contains subject matter related to Japanese Patent Application Nos. 2005-074136 filed in the Japanese Patent Office on Mar. 15, 2005, 2005-163757 filed on Jun. 3, 2005, and 2006-064965 filed on Mar. 9, 2006, the entire contents of which are incorporated herein by reference.

TECHNICAL FIELD

The present invention relates to a retardation compensation plate used for retardation compensation for, for example, a liquid crystal panel, a retardation compensator employing the retardation compensation plate, a liquid crystal display device, and a projection image display apparatus.

BACKGROUND OF THE INVENTION

A projector, which achieves a large screen display by projecting an enlarged image onto a screen, has conventionally been known as a projection image display apparatus. Recently, in particular, a so-called liquid crystal projector, which optically modulates light emitted from a light source by using a liquid crystal display device and projects the light onto a screen, has become widespread. The liquid crystal display device displays an image in a display mode corresponding to the type of liquid crystal molecules used in a liquid crystal panel.

For example, a liquid crystal display device operating in a vertical aligned (VA) mode, in which liquid crystal molecules that have negative dielectric anisotropy are filled in the gap between a pair of substrates included in a liquid crystal panel so as to distribute light vertically, is well known. In the VA-mode liquid crystal display device, because the liquid crystal molecules are aligned substantially perpendicular to a main plane of each of the substrates when no electric field is applied, light passes through a liquid crystal layer substantially without changing a plane of polarization thereof. Therefore, arranging a polarizer on each of the top and the bottom of the substrates enables the black to be satisfactorily displayed when no electric field is applied. In contrast, when an electric field is applied, the liquid crystal molecules are aligned obliquely with respect to the main plane of the substrate, and resultant birefringence rotates the plane of polarization of incident light. Compared with a liquid crystal display device operating in a twisted nematic (TN) mode, the VA-mode liquid crystal display device has an advantage of realizing a higher contrast ratio.

The VA-mode liquid crystal display device obtains birefringence by obliquely aligning liquid crystal molecules during an application of an electric field. Therefore, when no electric field is applied, the liquid crystal molecules are aligned at a minute tilt angle (pretilt angle) in advance. Since the liquid crystal molecules are not completely perpendicular and are slightly oblique with respect to a main plane of a substrate when no electric field is applied, residual retardation occurs in a liquid crystal panel. As a result, a plane of polarization of normal incident light is rotated slightly, thus causing light leakage from a polarizer and thereby decreasing a contrast.

Additionally, in the VA-mode liquid crystal display device, when no electric field is applied, retardation is introduced with respect to oblique incident light. Therefore, if a cone angle of incident light is increased (F# is reduced) to acquire a high intensity (brightness), the contrast is decreased.

A projection image display apparatus, such as a three-panel liquid crystal display projector which has three liquid crystal panels corresponding to three colors (RGB), is known. The projection image display apparatus generally uses a prism-type polarization beam splitter (PBS) to perform polarization separation. However, the prism-type PBS has a large angular dependency, causing a decrease in the contrast. If the cone angle is limited in order to maintain an adequate contrast, it is disadvantageous in terms of the intensity (brightness).

To address this, a technique is proposed in which a decrease in the contrast caused by a prism-type PBS is reduced by placing a quarter wave plate between a liquid crystal panel and a polarizing plate (see Japanese Patent No. 3019813).

A method is suggested that uses a combination of a wire grid polarizer which has a small angular dependency, instead of the prism-type PBS, a reflective liquid crystal panel, and a retardation plate for compensating for the residual retardation caused by pretilting in the liquid crystal panel and for retardation with respect to oblique light (see Japanese Unexamined Patent Application Publication No. 2005-18071).

Japanese Unexamined Patent Application Publication No. 2000-227520 discloses a technique for producing a retardation plate by using a combination of two or more kinds of retardation films having different refractive properties.

SUMMARY OF THE INVENTION

However, since the rotation of the plane of polarization caused by pretilting varies among liquid crystal panels, the residual retardation to be compensated varies among the liquid crystal panels. In addition, because variations in the angle of placing another optical part are present, it is difficult to stably adjust the contrast merely by placing the quarter wave plate between the liquid crystal panel and the polarizing plate.

Adjusting the contrast by rotating the quarter wave plate about an axis perpendicular to the center of the liquid crystal panel, the axis acting as a rotation axis, is considered as one approach. However, since the quarter wave plate has a large amount of the change in the retardation with respect to an angle of rotation, it is necessary to rotate the quarter wave plate with high accuracy (e.g., 0.5 degree or lower). Therefore, the contrast optimization is difficult.

To compensate for residual retardation in a liquid crystal panel and achieve a high contrast, a retardation plate having a small amount of retardation is required. Although the amount of retardation varies depending on the used liquid crystal panel, a retardation plate having a minute amount of retardation that is an in-plane retardation of 30 nm or less is required.

The present invention aims to solve the problems described above. An object of the present invention is to provide a retardation compensation plate, retardation compensator, liquid crystal display device, and projection image display apparatus that are capable of readily performing contrast adjustment and flexibly accommodating variations among liquid crystal panels.

To attain the object, the present invention provides a retardation compensating plate for compensating for residual retardation of a liquid crystal panel, the retardation plate having a birefringence. An in-plane retardation $R0c$ of the retardation compensating plate is larger than an in-plane retardation R0p of the liquid crystal panel. More specifically, the in-plane retardation R0c of the retardation compensating plate and the in-plane retardation R0p of the liquid crystal panel satisfy a relationship of 1<R0c/R0p≦10.

In the present invention, since the in-plane retardation R0c of the retardation compensating plate and the in-plane retardation R0p of the liquid crystal panel satisfy a relationship of 1<R0c/R0p≦10, changes in the amount of compensated retardation among rotation angles occurring when the retardation compensating plate is set with respect to the liquid crystal panel can be confined within narrow limits. Therefore, the contrast can be adjusted readily, and variations in residual retardation among the individual liquid crystal panels can be accommodated flexibly.

Preferably, the in-plane retardation of the retardation compensating plate may be 30 nm or less. This is because, if the in-plane retardation of the retardation compensating plate exceeds 30 nm, the in-plane retardation R0c of the retardation compensating plate is too large with respect to the in-plane retardation R0p of the liquid crystal panel, thus making it difficult to compensate for a minute retardation.

In this case, constructing the birefringence layer as a laminated construction of two or more retardation films and combining an in-plane optic axis (slow axis) of at least one of the retardation films in a different direction with respect to the other retardation films enable a necessary in-plane retardation to be readily obtained with high accuracy. The vertical retardation of the retardation compensating plate can be adjusted depending on the number of retardation films laminated. In particular, the retardation compensating plate preferably may have negative vertical retardation.

Preferably, the retardation compensating plate may include an antireflection film disposed on at least one of both main planes of the retardation compensating plate. Preferably, the retardation compensating plate may be mounted on the liquid crystal panel such that the slow axis of the retardation compensating plate is rotated from 45 to 85 degrees with respect to the slow axis of the liquid crystal panel. Preferably, the retardation compensating plate may include a transparent support having isotropy and a birefringence layer disposed on the transparent support.

In the specification, when nx and ny are in-plain principal refractive indices of a retardation film, nz is a refractive index in the direction of thickness, and d is the thickness of the retardation film, nx is represented as an optic axis (slow axis), ny is represented as a fast axis, Δn=nx−ny is represented as the difference between the in-plane refractive indices, and Δn×d is represented as the in-plane retardation, or simply as the retardation. The magnitude (value) of retardation may be represented as the amount of retardation.

BRIEF DESCRIPTION OF THE DRAWINGS

FIG. 17 illustrates the angular dependencies of effective retardation in the case in which two kinds of retardation films, one having an in-plane retardation of 70 nm and the other having an in-plane retardation of 50 nm, are laminated at a lamination angle of 90°, 67.5°, and 45°;

FIG. 18 illustrates the angular dependencies of the effective retardation in the case in which, when two films, each having an in-plane retardation of 5 nm, another two films, each having an in-plane retardation of 50 nm, another two films, each having an in-plane retardation of 100 nm, and another two films, each having an in-plane retardation of 200 nm, are prepared, two films of the same kind are laminated on top of each other at a lamination angle of 45°;

DETAILED DESCRIPTION OF THE PREFERRED EMBODIMENTS

The preferred embodiments of the present invention are described with reference to the drawings.

A retardation compensating plate and retardation compensator are used to compensate for residual retardation of a liquid crystal panel in a projection image display apparatus including a liquid crystal display device. First, one example configuration of the projection image display apparatus and its operation are described with reference to FIG. 1.

[Projection Image Display Apparatus]

Figure 1:
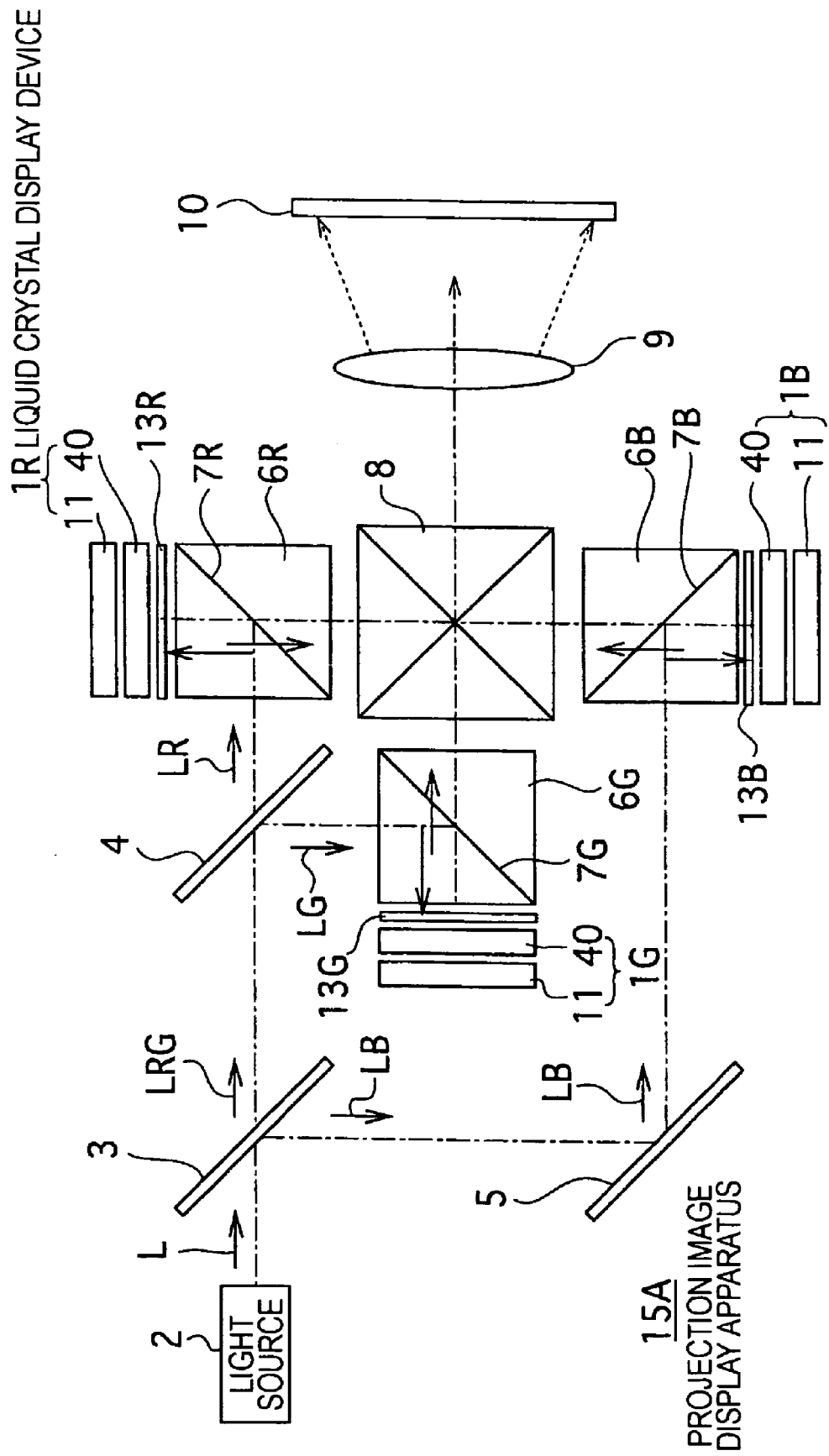
FIG. 1 illustrates a schematic structure of a projection image display apparatus according to one embodiment of the present invention.

FIG. 1 shows a schematic structure of a projection image display apparatus 15A according to an embodiment of the present invention. The projection image display apparatus 15A is a so-called three-panel liquid crystal projector, which displays color images by using three liquid crystal light valves corresponding to red, green, and blue components. As illustrated in FIG. 1, the projection image display apparatus 15A includes liquid crystal display devices 1R, 1G, and 1B, a light source 2, dichroic mirrors 3 and 4, a total reflection mirror 5, polarization beam splitters 6R, 6G, and 6B, a combining prism 8, and a projection lens 9.

The light source 2 is configured to emit light-source light (white light) L including a blue light beam $L_B$, a green light beam $L_G$, and a red light beam $L_R$, which is required for displaying color images, and includes, for example, a halogen lamp, metal halide lamp, or a xenon lamp.

The dichroic mirror 3 has a function of separating the light-source light L into the blue light beam $L_B$ and the other color light beams $L_{RG}$. The dichroic mirror 4 has a function of separating the light beams $L_{RG}$ that has passed through the dichroic mirror 3 into the red light beam $L_R$ and green light beam $L_G$. The total reflection mirror 5 reflects the blue light beam $L_B$ separated by the dichroic mirror 3 toward the polarization beam splitter 6B.

The polarization beam splitters 6R, 6G, and 6B are prism-type polarization-separating elements disposed along the optical paths of the red light beam $L_R$, green light beam $L_G$, and blue light beam $L_B$, respectively. The polarization beam splitters 6R, 6G, and 6B have polarization-separating faces 7R, 7G, and 7B, respectively, and have a function of separating incoming a corresponding color light beam into two polarized light components orthogonal to each other. Each of the polarization-separating faces 7R, 7G, and 7B reflects a first polarized light component (e.g., an s-polarized light component) and allows a second polarized light component (e.g., a p-polarized light component) to pass therethrough.

The liquid crystal display devices 1R, 1G, and 1B receive incoming color light having a predetermined polarized light component (e.g., an s-polarized light component) separated by the polarization-separating faces 7R, 7G, and 7B of the polarization beam splitters 6R, 6G, and 6B, respectively. The liquid crystal display devices 1R, 1G, and 1B are driven depending on the drive voltage applied on the basis of an image signal and have a function of modulating the incident light and reflecting the modulated light toward the polarization beam splitters 6R, 6G, and 6B.

Between the polarization beam splitters 6R, 6G, and 6B and the liquid crystal display devices 1R, 1G, and 1B, quarter-wave plates 13R, 13G, and 13B are disposed, respectively, and each of retardation compensators 40 is disposed. The quarter-wave plates 13R, 13G, and 13B has a function of reducing a decrease in contrast resulting from the angular dependencies of the incident light in the polarization beam splitters 6R, 6G, and 6B. The retardation compensators 40 have a function of compensating for residual retardation of liquid crystal panels included in the liquid crystal display devices 1R, 1G, and 1B. The retardation compensators 40 will be described in greater detail below.

The combining prism 8 has a function of combining color light beams having predetermined polarized light components (e.g., p-polarized light components) that have passed through the polarization beam splitters 6R, 6G, and 6B after having been emitted from the liquid crystal display devices 1R, 1G, and 1B. The projection lens 9 has a function of projecting the combined light from the combining prism 8 toward a screen 10.

Next, the operation of the projection image display apparatus 15A having the structure described above is explained.

First, the white light L emitted from the light source 2 is separated into the blue light beam $L_B$ and the other color light beams (red and green light beams) $L_{RG}$ by the function of the dichroic mirror 3. The blue light beam $L_B$ is reflected toward the polarization beam splitter 6B by the function of the total reflection mirror 5.

The other color light beams (red and green light beams) $L_{RG}$ are then separated into the red light beam $L_R$ and green light beam $L_G$ by the function of the dichroic mirror 4. The separated red light beam $L_R$ and the separated green light beam $L_G$ enter the polarization beam splitters 6R and 6G, respectively.

The polarization beam splitters 6R, 6G, and 6B separate the corresponding received color light beams into two polarized light components orthogonal to each other at the polarization-separating faces 7R, 7G, and 7B, respectively. At this time, the polarization-separating faces 7R, 7G, and 7B reflect first polarized light components (e.g., s-polarized light components) toward the liquid crystal display devices 1R, 1G, and 1B, respectively. The liquid crystal display devices 1R, 1G, and 1B are driven depending on the driving voltage applied on the basis of image signals and modulate the corresponding received color light beams having predetermined polarized light components in units of pixels.

The liquid crystal display devices 1R, 1G, and 1B reflect the corresponding modulated color light beams toward the polarization beam splitters 6R, 6G, and 6B, respectively. The polarization beam splitters 6R, 6G, and 6B allow only predetermined polarized light components (e.g., p-polarized light components) among the light beams (modulated beams) reflected from the liquid crystal display devices 1R, 1G, and 1B to pass therethrough so as to emit them toward the combining prism 8.

The combining prism 8 combines the color light beams having the predetermined polarized light components that have passed through the polarization beam splitters 6R, 6G, and 6B and emits the combined light toward the projection lens 9. The projection lens 9 projects the combined light emitted from the combining prism 8 toward the screen 10. Therefore, an image associated with the light modulated by the liquid crystal display devices 1R, 1G, and 1B is projected on the screen 10, so that a desired image display is performed.

Figure 2:
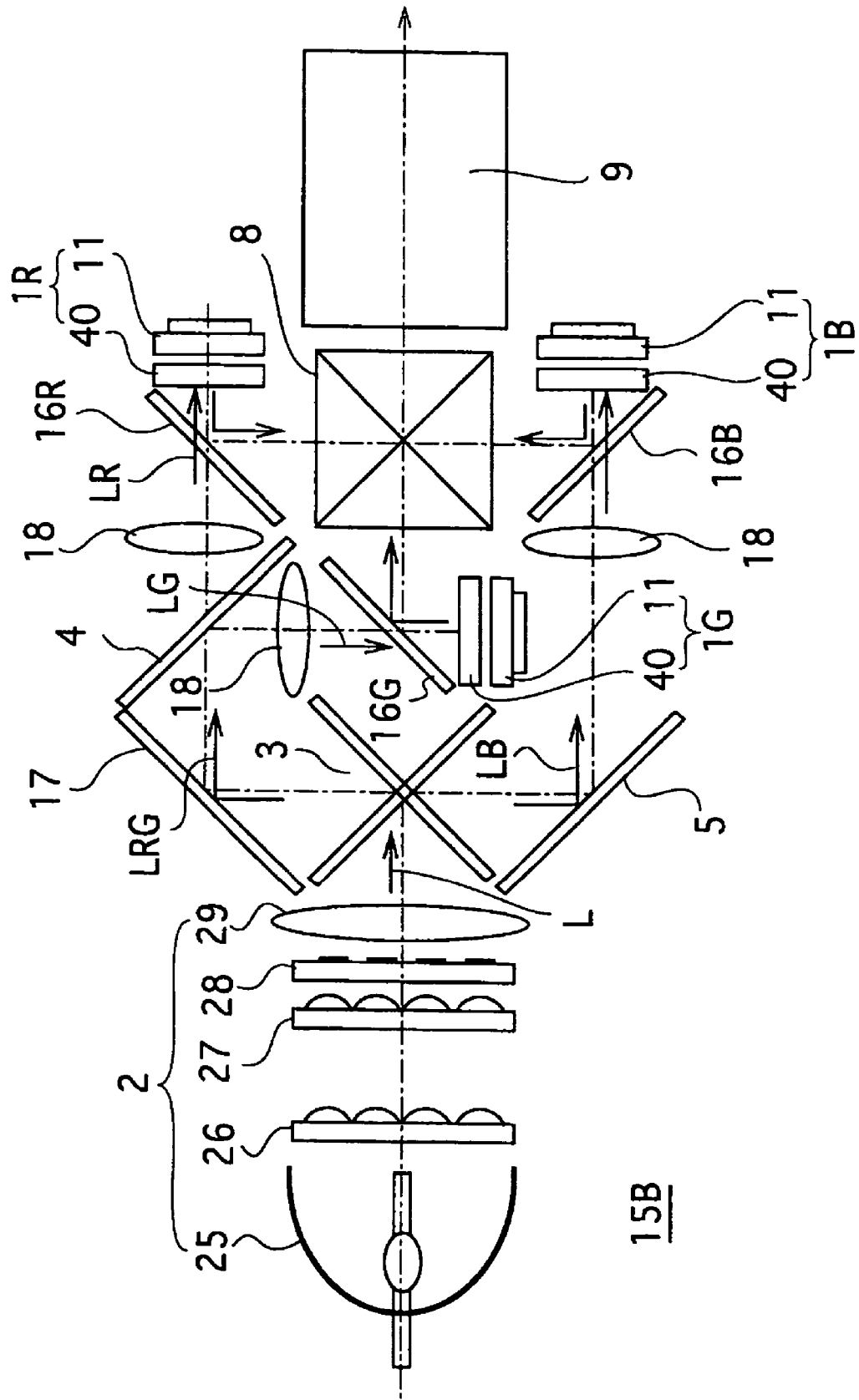
FIG. 2 illustrates a schematic structure of a projection image display apparatus according to another embodiment of the present invention.

FIG. 2 illustrates another example configuration of the projection image display apparatus according to the present invention. In a shown projection image display apparatus 15B, wire-grid polarizers 16R, 16G, and 16B are disposed as the polarization-separating elements, instead of the prism-type polarization beam splitters 6 illustrated in FIG. 1. In FIG. 2, the same reference numerals are used as in FIG. 1 for corresponding parts.

The use of wire-grid polarizers does not require quarter-wave plates because the wire-grid polarizers have a small angular dependency and high heat resistance compared with prism-type polarization beam splitters. As a result, the wire-grid polarizer can be suitably used as the polarization-separating element for a projection image display apparatus, which utilizes a light source having a large amount of light. In this example, an image is displayed on a screen (not shown) by the same action as in FIG. 1.

In FIG. 2, reference numeral 17 represents a total reflection mirror, and reference numeral 18 represents a relay lens. FIG. 2 illustrates one example configuration of the light source 2. Reference numeral 25 represents a lamp unit for generating the light-source light L, reference numerals 27 and 28 represent a pair of microlens arrays for making the brightness of the light-source light L uniform, reference numeral 28 represents a PS converter for converting the polarizing direction of the light-source light L into a polarized wave having one polarization direction, and reference numeral 29 represents a position-adjusting lens for adjusting the radiating position of the light-source light L.

The wire-grid polarizer is a grid of thin metallic wires having a pitch, width, and height that are smaller than the wavelength of incident light formed on a transparent (e.g., glass) substrate and permits the appearance of a predetermined polarization property by reflecting a polarized light component parallel to the metallic wires and allowing a polarized light component orthogonal to the metallic wires to pass therethrough. In the case of being placed perpendicular to the incident light, the wire-grid polarizer functions as a polarizer. As illustrated in FIG. 2, in the case in which the wire-grid polarizer is placed non-perpendicular to the incident light, the wire-grid polarizer functions as a polarization beam splitter. When the wire-grid polarizer is used as the polarization beam splitter, no polarizing plate is required for the liquid crystal display.

[Liquid Crystal Display Device]

Figure 3:
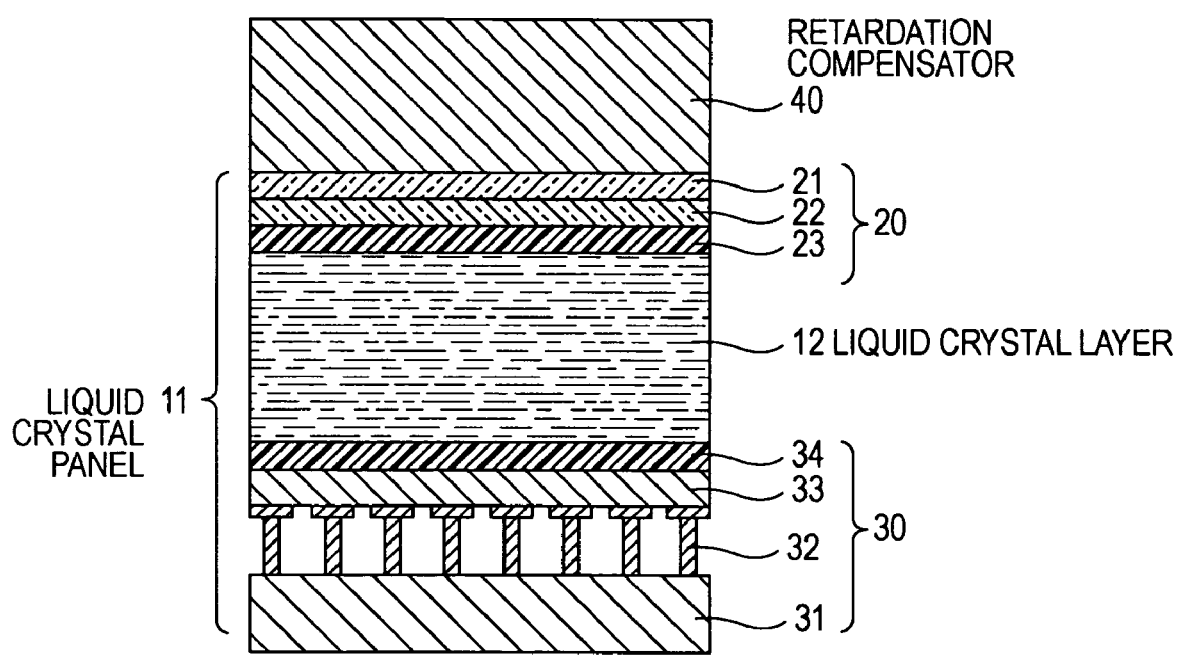
FIG. 3 is a cross-sectional view that schematically illustrates a structure of a liquid crystal display device according to one embodiment of the present invention.

With reference to FIG. 3, the liquid crystal display devices 1R, 1G, and 1B are described below. FIG. 3 is a cross-sectional view that illustrates one example configuration of the liquid crystal display devices 1R, 1G, and 1B according to one embodiment of the present invention. As illustrated in FIG. 3, each of the liquid crystal display devices 1R, 1G, and 1B includes a liquid crystal panel 11 acting as a light valve and the retardation compensator 40 which is disposed on a side of the liquid crystal panel 11 opposed to the polarization beam splitter.

The liquid crystal panel 11 is, for example, a reflective homeotropic liquid crystal element, in which liquid crystal molecules are vertically aligned during no application of a voltage, and includes an opposing substrate 20, a pixel-electrode substrate 30, both are opposed to each other, and a liquid crystal layer 12, in which liquid crystal molecules are filled in the gap between the opposing substrate 20 and the pixel-electrode substrate 30. As the liquid crystal constituting the liquid crystal layer 12, liquid crystal having negative dielectric anisotropy, for example nematic liquid crystal having negative dielectric anisotropy, is used.

The opposing substrate 20 is formed by sequentially laminating a transparent electrode 22 and an alignment layer 23 on a transparent base 21. The transparent base 21 is, for example, a glass substrate formed from a soda glass, non-alkali glass, or silica glass. The transparent electrode 22 is formed form a transparent conductive oxide material, such as indium tin oxide (ITO), which is solid solution of tin oxide ($SnO_2$) and indium oxide ($In_2O_3$), or the like. The transparent electrode 22 is at a potential common to all pixel areas (e.g., ground potential).

The alignment layer 23 is formed from, for example, a polyimide organic compound, and a first surface thereof that faces the liquid crystal layer 12 is subjected to rubbing in order to align the liquid crystal molecules constituting the liquid crystal layer 12 in a predetermined direction.

The pixel-electrode substrate 30 is formed by sequentially laminating a reflective electrode layer 33 and then an alignment layer 34 on a supporting base 31. The supporting base 31 is, for example, a silicon substrate. On the supporting base 31, a switching element 32 of, for example, a complementary metal oxide semiconductor (CMOS) type is provided. The reflective electrode layer 33 includes a plurality of reflective pixel electrodes. These pixel electrodes are configured such that a driving voltage is applied thereon by the switching element 32.

As a material of the pixel electrode, that exhibiting a high reflectivity to visible light may be preferable, and aluminum is used, for example. As is the case with the alignment layer 23 of the opposing substrate 20, the alignment layer 34 is formed from, for example, a polyimide organic compound, and a first surface thereof that faces the liquid crystal layer 12 is subjected to rubbing in order to align the liquid crystal molecules constituting the liquid crystal layer 12 in a predetermined direction.

[Retardation Compensator]

The retardation compensator 40 serving as an optical compensating element according to the present invention is described in detail below. The retardation compensator 40 is disposed on the liquid crystal panel 11 having the structure described above in each of the liquid crystal display devices 1R, 1G, and 1B.

Figure 4:
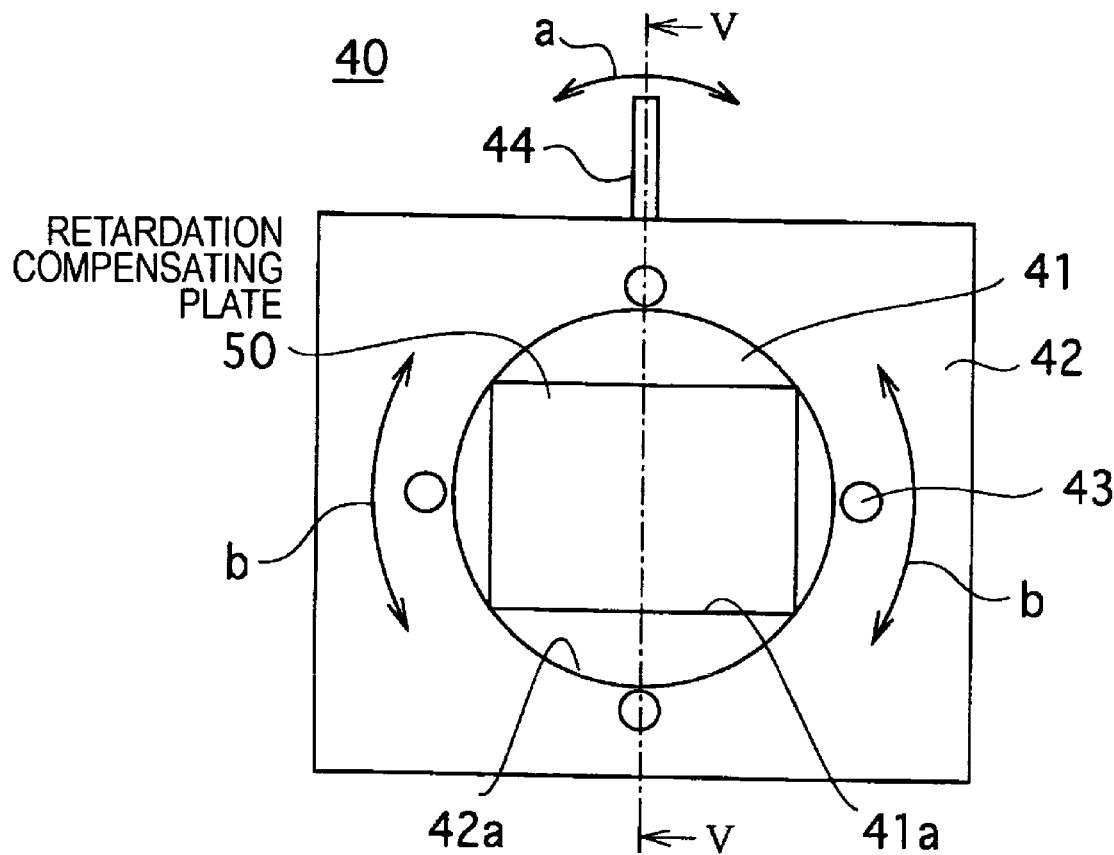
FIG. 4 is a plan view that illustrates a structure of a retardation compensator according to one embodiment of the present invention.
Figure 5:
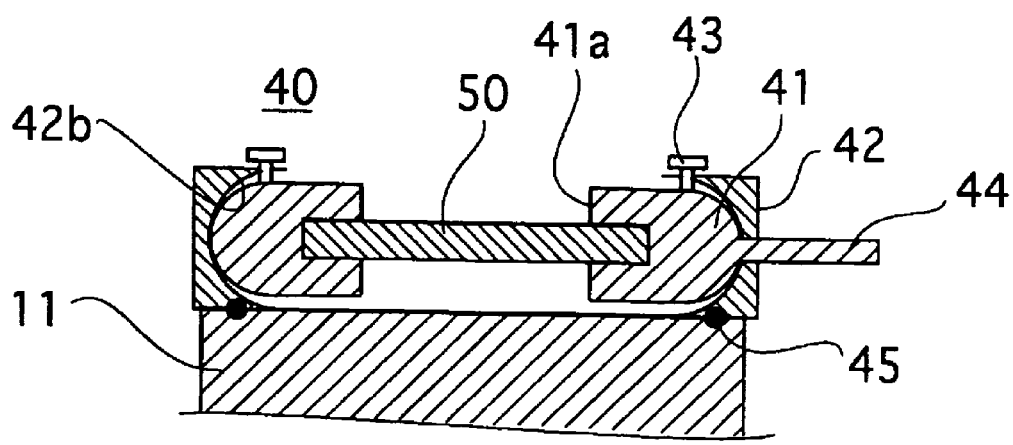
FIG. 5 is a cross-sectional view taken along the line [V]-[V] of FIG. 4.

FIG. 4 is a plan view illustrating one example of the retardation compensator 40. FIG. 5 is a cross-sectional view illustrating the example of the retardation compensator 40. As illustrated in FIGS. 4 and 5, the retardation compensator 40 includes a retardation compensating plate 50, a rotating body 41 for rotating the retardation compensating plate 50, and a housing unit 42 for holding the rotating body 41 so as to allow the rotating body 41 to be freely rotatable about an axis, acting as an rotation axis, perpendicular to a main plane of the liquid crystal panel 11.

As illustrated in FIG. 5, the retardation compensator 40 is closely fixed to the liquid crystal panel 11 with an O ring 45. Closely fixing it like this can protect dust from entering the gap between the liquid crystal panel 11 and the retardation compensator 40. The rotating body 41 and the housing unit 42 are one example of rotating means of the present invention.

The rotating body 41 is disc-shaped and includes a rectangular opening 41a at the center thereof. The rotating body 41 is constructed so as to hold the retardation compensating plate 50 therein, and when the retardation compensating plate 50 is held in the rotating body 41, the retardation compensating plate 50 is exposed through the opening 41a.

The housing unit 42 holds the rotating body 41 such that the rotating body 41 can rotate in an in-plane direction of the liquid crystal panel 11 about an axis perpendicular to the main plane of the liquid crystal panel 11, the axis acting as the rotation axis. The housing unit 42 is a rectangular plate and includes a circular opening 42a at the center thereof. A side face 42b of the opening 42a is uniformly recessed so as to be capable of fitting the rotating body 41. A side face of the housing unit 42 is provided with an angle adjusting member 44 connected to an end face of the rotating body 41. When the angle adjusting member 44 is moved in the direction indicated by the arrow a, the rotating body 41 rotates in the direction indicated by the arrow b in cooperation therewith. On the periphery of the opening 42a, one or more fixing screws 43 for fixing the position of the rotating body 41 are disposed. When the number of the fixing screws 43 is two or more, the fixing screws 43 are evenly spaced. The method for fixing the position of the rotating body 41 is not limited to the use of the fixing screws 43. For example, the rotating body 41 may be bonded and fixed to the housing unit 42 by using an adhesive, or alternatively, a clamping mechanism for mechanically holding the adjustment position of the angle adjusting member 44 may be disposed.

The retardation compensator 40 according to this embodiment is disposed between each of the polarization beam splitters 6R, 6G, and 6B or each of the wire-grid polarizers 16R, 16G, and 16B and the front face of each of the liquid crystal panels 11 (FIGS. 1 and 2). Rotating the retardation compensating plate 50 about an axis perpendicular to the liquid crystal panel 11, the axis acting as the rotation axis, and appropriately setting the rotation angle of the slow axis of the retardation compensating plate 50 with respect to each slow axis of the liquid crystal panel 11 enables the contrast to be adjusted. Setting the orientation of the slow axis of the retardation compensating plate 50 is performed by the operation of rotating the angle adjusting member 44 in the direction of the arrow a.

Figure 6A:
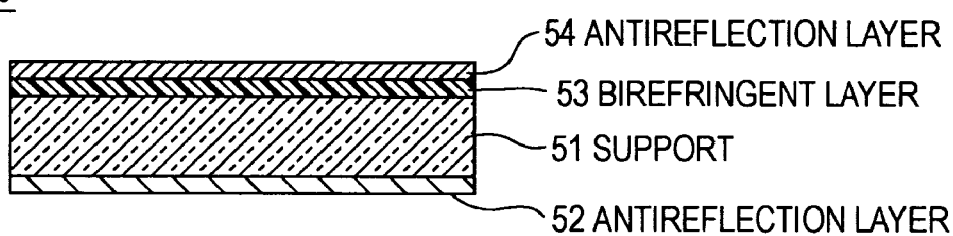
FIGS. 6A and 6B are cross-sectional views that schematically illustrate example configurations of a retardation compensation plate.

FIG. 6A is a cross-sectional view that illustrates one example configuration of the retardation compensating plate 50. The retardation compensating plate 50 has a function of compensating for the residual retardation caused by pretilting of liquid crystal molecules. As illustrated in FIG. 6A, the retardation compensating plate 50 includes a support 51, an antireflection film 52 disposed on a first surface, which faces the liquid crystal panel 11, of the support 51, a birefringence layer 53, and an antireflection film 54, which are sequentially formed on a second surface, which faces the combining prism 8, of the support 51.

Figure 6B:
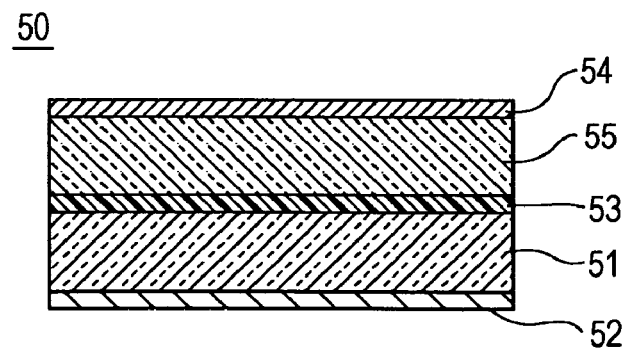

As illustrated in FIG. 6B, the retardation compensating plate 50 may further include a support 55 disposed between the birefringence layer 53 and the antireflection film 54 such that a pair of the supports 51 and 55 sandwiches the birefringence layer 53. The material of the support 55 can be the same as that of the support 51. Such a structure can increase durability to withstand temperature variations.

The structure of the retardation compensating plate 50 is not limited to that described above. For example, when the birefringence layer 53 is capable of independently standing sufficiently (freestanding), the supports 51 and 55 may not be used. When the supports 51 and 55 are not used, the antireflection films 52 and 54 are formed directly on a corresponding face of both main planes of the birefringence layer 53.

The support 51 serves to support the birefringence layer 53 and has transparency and isotropy. As the material of the support 51, a glass, such as soda glass, non-alkali glass, silica glass, or the like, a plastic, or the like can be used, for example. Preferably, the glass may be used to acquire good isotropy.

The antireflection films 52 and 54 are used to prevent reflection of incident light (e.g., red, green, and blue light components), and may preferably have a reflectivity of 1% or less. A reflectivity of 1% or less can reduce a decrease in contrast caused by reflected light. Each of the antireflection films 52 and 54 is, for example, a single-layer antireflection film or a multi-layer antireflection film of two or more layers. Examples of a method for forming these antireflection films include sputtering.

The birefringence layer 53 includes a retardation plate having a minute in-plane retardation and a negative vertical retardation. Preferably, the birefringence layer 53 may have stability in the retardation and the direction of the in-plane optical axis, high transmittance, adhesiveness and the like. More preferably, the birefringence layer 53 may have properties of high heat resistance, low water absorbency, a small photoelastic coefficient, and the like. Examples of a film that exhibits these properties include a norbornene-based film, polycarbonate (PC) film, cellulose triacetate film, polymethyl methacrylate (PMMA) film, and the like.

As an adhesive for bonding the support 51 and the birefringence layer 53, that having isotropy and an optical property that varies little with environmental change (e.g., thermal change) may preferably be used. For example, a pressure-sensitive adhesive (e.g., an adhesive sheet), a light-curable adhesive (e.g., an ultraviolet-curable adhesive or visible-light-curable adhesive), or a thermosetting adhesive is used.

The birefringence layer 53 serves to compensate for retardation caused by pretilting of liquid crystal molecules. The in-plane retardation of the retardation compensating plate 50 is adjusted by the in-plane retardation of the birefringence layer 53. In this embodiment, the in-plane retardation of the birefringence layer 53 is set so as to satisfy a relationship of $1 < R0c/R0p \leq 10$, more preferably, $2 \leq R0c/R0p \leq 10$, most preferably, $5 \leq R0c/R0p \leq 8$, where $R0c$ represents the in-plane retardation of the birefringence layer 53, and $R0p$ represents the in-plane retardation of the liquid crystal panel 11.

If $1 \geq R0c/R0p$, the amount of compensated retardation is prone to be insufficient or accommodating variations in retardation among the liquid crystal panels 11 or in the angle of placing an optical part is prone to be difficult because of the limitation of the rotation adjusting angle of the retardation compensating plate 50. If $10 < R0c/R0p$, variations in the amount of compensated retardation of the retardation compensating plate 50 with respect to the rotation are large, and thus fine adjustment is prone to be difficult.

Figure 7:
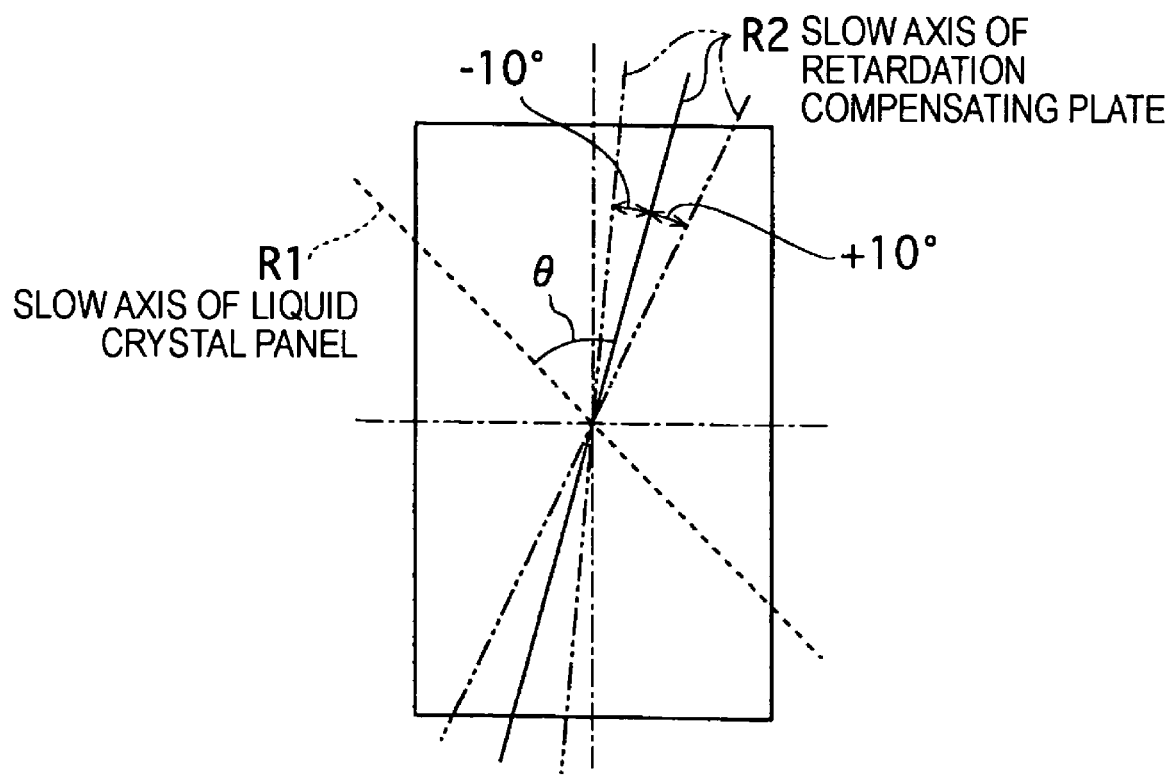
FIG. 7 is a schematic diagram for explaining the relationship between the slow axis of a liquid crystal panel and the slow axis of a retardation compensation plate.

FIG. 7 is a schematic diagram illustrating the direction of the slow axis of the retardation compensating plate 50. As illustrated in FIG. 7, the direction of the slow axis of the retardation compensating plate 50, R2, is set so as to be rotated an angle of $\theta$ with respect to the direction of the slow axis of the liquid crystal panel 11, R1. The angle $\theta$ between the slow axis R2 of the retardation compensating plate 50 and the slow axis R1 of the liquid crystal panel 11 is set at the range of 45 to 85 degrees, more preferably, the range of 45 to 65 degrees. The direction of the slow axis R1 of the liquid crystal panel 11 represents the direction of tilt alignment of liquid crystal molecules.

The direction of the slow axis R2 is determined by the value of the in-plane retardation of the liquid crystal panel 11 ($R0p$) and that of the retardation compensating plate 50 ($R0c$). In other words, the optic axis of the retardation compensating plate 50 is rotated such that the in-plane retardation of the retardation compensator 40 is the same as that of the liquid crystal panel 11 and they are combined. The retardation compensator 40 is configured such that the retardation compensating plate 50 can be rotated an angle in the range of ±10 degrees (from −10 to +10 degrees).

An explanation is given below with reference to specific examples.

Figure 8:
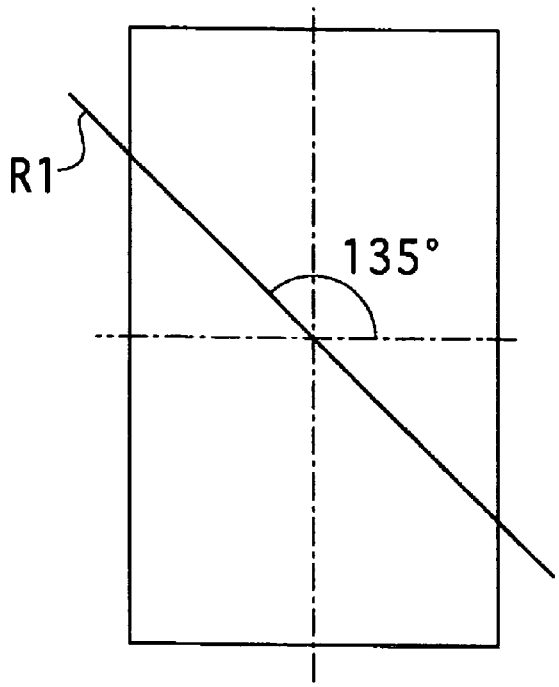
FIG. 8 is a schematic diagram that illustrates the direction of the slow axis of a liquid crystal panel.
Figure 9:
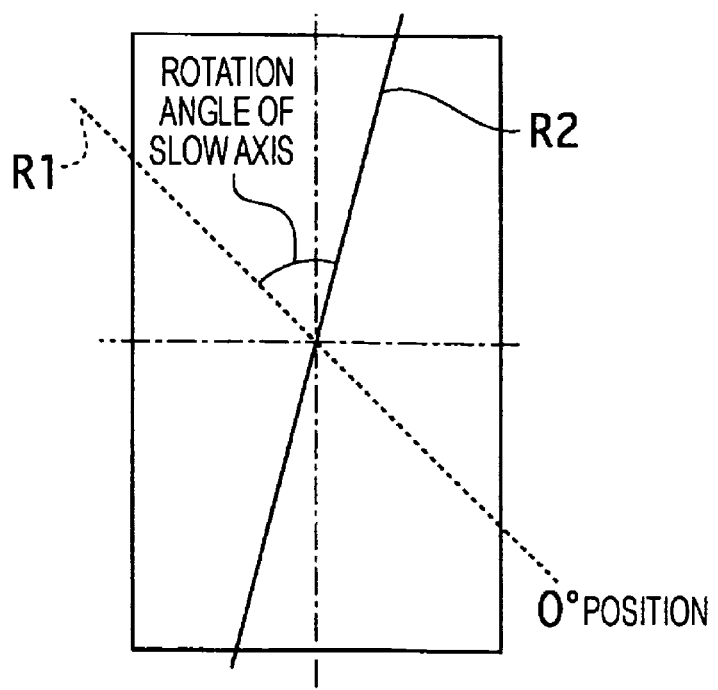
FIG. 9 is a schematic diagram that illustrates the direction of the slow axis of a retardation compensation plate.
Figure 10:
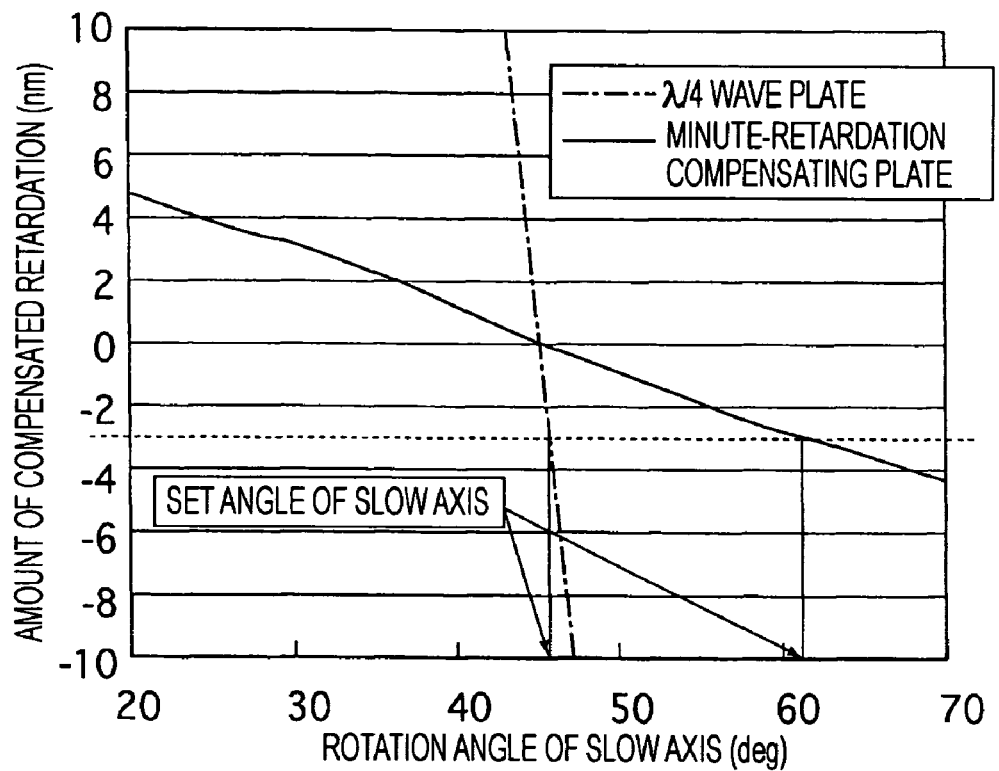
FIG. 10 illustrates the relationship between the rotation angle of a retardation compensation plate to a liquid crystal panel and the amount of compensated retardation.

FIG. 8 is a schematic diagram illustrating the direction of the slow axis of the liquid crystal panel. FIG. 9 is a schematic diagram illustrating the direction of the slow axis of the retardation compensating plate. In the case in which, for example, a minute-retardation compensating plate having an in-plane retardation of 6 nm is disposed on a liquid crystal panel with an in-plane retardation of 3 nm, the relationship between a rotation angle ($\theta$) and the amount of compensated retardation when the retardation compensating plate is rotated clockwise from 0 degree being at which the slow axis R1 of the liquid crystal panel matches the slow axis R2 of the retardation compensating plate is illustrated in FIG. 10. In FIG. 10, alternate long and short dashed lines indicate the results of measurement that uses a quarter-wave plate (having an in-plane retardation of 128 nm) for comparison.

In the embodiment illustrated in FIG. 10, when the in-plane retardation of the liquid crystal panel is 3 nm, an amount of −3 nm is required as the amount of compensated retardation of the retardation compensating plate. Therefore, if a quarter-wave plate is used, since variations in the amount of compensated retardation with respect to the rotation of the slow axis thereof are significantly large, it is necessary to set the rotation angle of the slow axis with an accuracy of ±0.5 degree or less to acquire an amount of compensated retardation of the order of −3 nm. Therefore, the optimization of the contrast is difficult. If a displacement is present in the direction of the slow axis, the compensation function largely decreases because the amount of compensated retardation is largely changed.

In contrast to this, when a minute-retardation compensating plate having an in-plane retardation of 6 nm is used, it is necessary to rotate the slow axis R2 approximately 60 degrees to acquire an amount of compensated retardation of −3 nm. In this case, since variations in the amount of compensated retardation with respect to the rotation of the slow axis thereof are small and fine adjustment of the contrast is easy by virtue of a rotation of ±10 degrees of the slow axis R2, variations among liquid crystal panels can be accommodated. It is found that even when a displacement is present in the direction of the slow axis R2, a decrease in the compensation function is small.

As described above, adjusting the direction of the slow axis of the minute-retardation compensating plate and providing a rotation mechanism for fine adjustment enable the optimization of the contrast with high accuracy and retardation compensation that flexibly accommodates variations in the amount of pretilting among liquid crystal panels.

Figure 11:
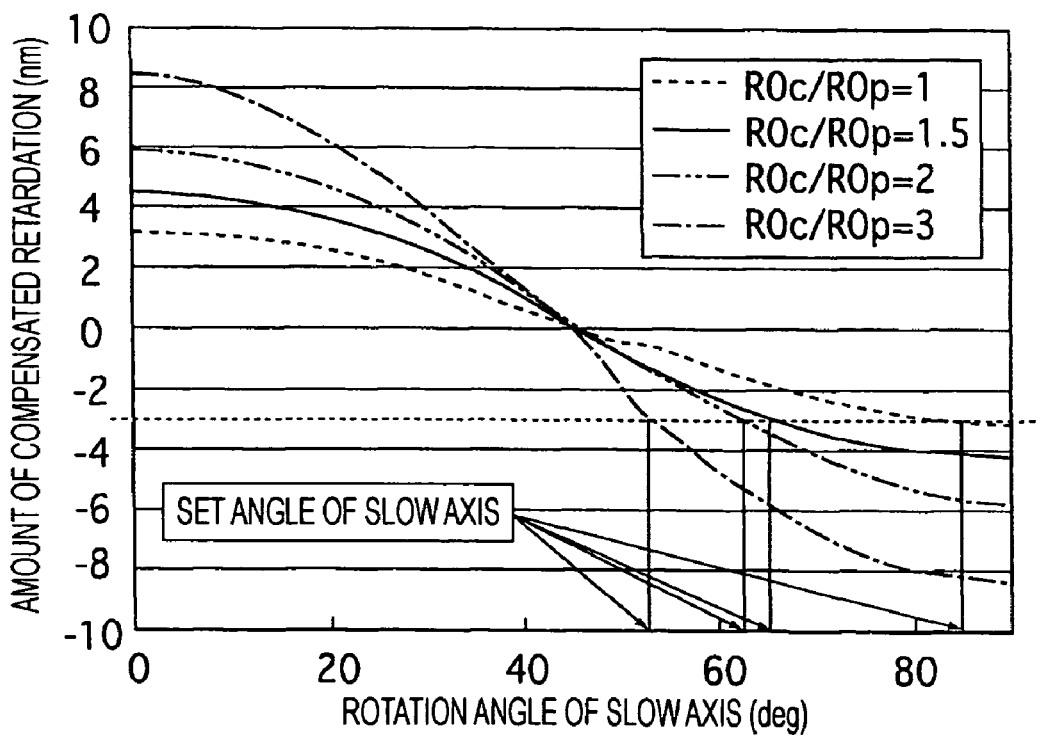
FIG. 11 illustrates the relationship between the rotation angle of each retardation compensation plate and the amount of compensated retardation when a plurality of retardation compensation plates having different in-plane retardations are applied to a liquid crystal panel.

FIG. 11 illustrates the relationship between the rotation angle of the slow axis R2 and the amount of compensated retardation of the retardation compensating plate when the ratio between the in-plane retardation R0c of the retardation compensating plate and the in-plane retardation R0p of the liquid crystal panel (R0c/R0p) varies. The example in FIG. 11 indicates a case in which the in-plane retardation R0p of the liquid crystal panel is 3 nm, and the in-plane retardation R0c of the minute-retardation compensating plate is 3 nm (R0c/R0p=1), 3.6 nm (R0c/R0p=1.5), 6 nm (R0c/R0p=2), and 9 nm (R0c/R0p=3).

As illustrated in FIG. 11, when R0c/R0p=1, an amount of compensated retardation of approximately −3 nm is acquired by rotating the slow axis R2 of the retardation compensating plate approximately 85 degrees with respect to the slow axis R1 of the liquid crystal panel. There are few variations in the amount of compensated retardation with respect to changes in the position of the axis, and the contrast compensation can be stably performed. However, if the in-plane retardation of the liquid crystal panel varies from 3 nm, it is necessary to largely adjust the rotation angle ±10 degrees or more, so that a necessary amount of compensated retardation may not be acquired. In addition, it is difficult to provide a rotating mechanism for rotating the retardation compensating plate up to the range of ±10 degrees or more in view of a construction of mounting the retardation compensator on the liquid crystal panel.

In contrast, when R0c/R0p=1.5, an amount of compensated retardation of approximately −3 nm is acquired by rotating the slow axis R2 of the retardation compensating plate approximately 65 degrees with respect to the slow axis R1 of the liquid crystal panel. The equivalent amount of compensated retardation is acquired by rotating it approximately 62 to 63 degrees for R0c/R0p=2 and approximately 52 degrees for R0c/R0p=3. The variations in the amount of compensated retardation with respect to the changes in the position of the axis are larger than a case of R0c/R0p=1, but they are not as large as those of a quarter-wave plate, so that the influence on the contrast is small. In addition, it is possible to adjust the amount of compensated retardation larger and smaller than −3 nm, so that the optimization of liquid crystal panels having variations in the amount of retardation can be performed. Moreover, variations in the amount of retardation among liquid crystal panels can be accommodated within the range of ±10 degrees or less of the rotation adjusting angle.

As described above, the in-plane retardation R0c of the retardation compensating plate is larger than the in-plane retardation R0c of the liquid crystal panel so as to satisfy a relationship of R0c/R0p>1, thereby allowing the amount of the in-plane retardation of the liquid crystal panel to be compensated with high accuracy and enabling the contrast to be adjusted readily.

In general, an in-plane residual retardation of a homeotropic liquid crystal on silicon (LCOS) panel is a minute value. Therefore, during compensation of retardation, the contrast is sensitive to non-uniformity in retardation of the retardation plate. As a result, the non-uniformity in retardation of the retardation plate may preferably be, for example, ±2 nm or less. Additionally, as the cone angle increases, the contrast becomes more sensitive to non-uniformity in vertical retardation of the retardation plate. Therefore, the non-uniformity in vertical retardation of the retardation plate may preferably be, for example, ±10 nm or less. The non-uniformity in retardation of the retardation plate is dependent on the degree of molecular orientation of a used film, a photoelastic coefficient of a photo-curable resin, and the like. As the film used as the retardation plate, a film that has a high degree of molecular orientation and stability in the direction of the optical axis and the amount of retardation may be preferable. A light-curable resin may be preferable that exhibits less anisotropy caused by stress.

One example of the relationship between non-uniformity in the in-plane retardation of the retardation plate and the contrast is shown in Table 1. In this example, the contrast was measured using samples having an amount of non-uniformity in the in-plane retardation of ±0.5 nm, ±1 nm, ±2 nm, and ±3 nm and having the same vertical retardation. One example of the relationship between non-uniformity in the vertical retardation of the retardation plate and the contrast is shown in Table 2. In this example, the contrast was measured using samples having an amount of non-uniformity in the vertical retardation of ±5 nm, ±10 nm, ±20 nm, and ±30 nm and having the same in-plane retardation.

The measurement of the retardation was performed using RETS-100 from Otsuka Electronics Co., Ltd. The evaluation of the contrast was performed using an optical system (F#=2.5) and on the basis of ±500 as a criterion with the central contrast value as a reference.

The results of Tables 1 and 2 show that a high contrast can be acquired in a small F# by setting non-uniformity in the in-plane retardation at ±2 nm or less and that in the vertical retardation at ±10 nm or less.

Figures 12A, 12B:
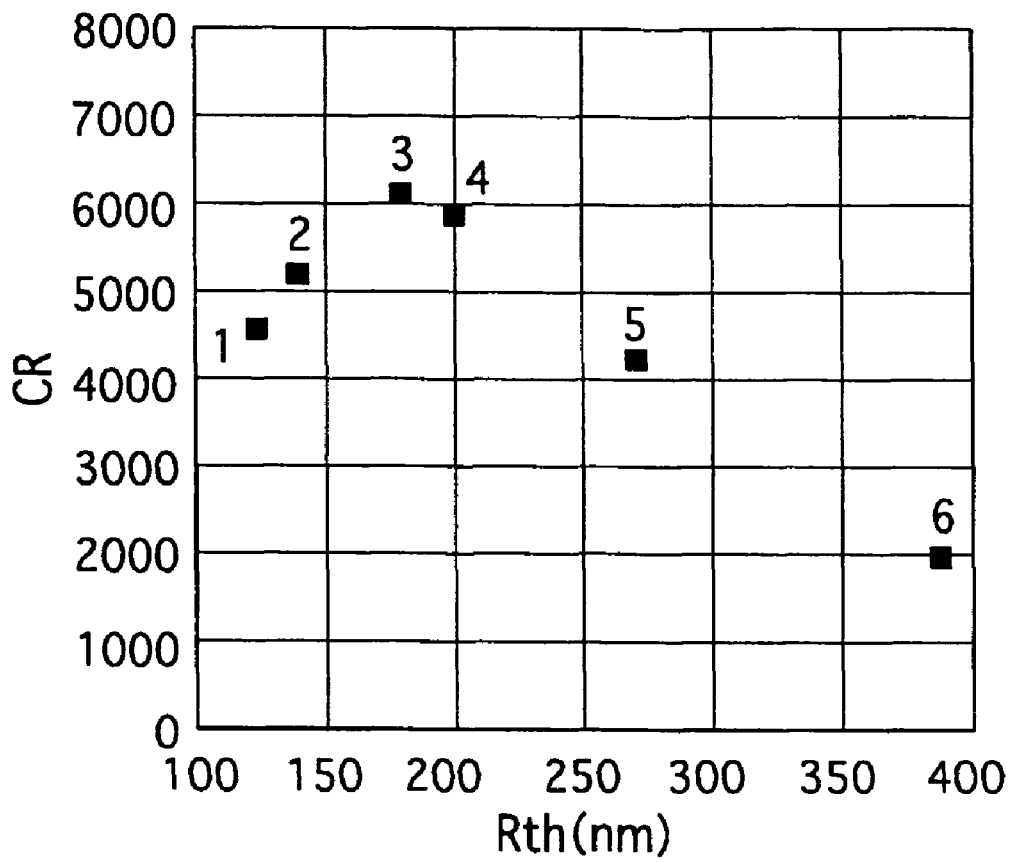
FIGS. 12A and 12B show the results of contrast measurement using a plurality of retardation compensation plates having different vertical retardations.

FIGS. 12A and 12B illustrate the contrast values corresponding to the samples (retardation compensating plates) measured using a homeotropic reflective liquid crystal panel, a wire-grid polarizer, and an optical system (F#=2.5) when a retardation compensator was formed using each of the retardation plates whose difference was only the amount of the vertical retardation (Rth). All the retardation plates used as the samples had an in-plane retardation (R0) of 12 nm. The vertical retardations (Rth) thereof were 124 nm, 140 nm, 180 nm, 200 nm, 270 nm, and 388 nm. The in-plane retardation (R0p) of the liquid crystal panel was in neighborhood of 2.5 nm. A contrast that appeared after the retardation (R0p) was compensated by rotating each of the retardation plates was measured. In this example, incident light in the green spectrum was used for the contrast measurement, and an antireflection film formed on a surface of the retardation plate was designed to have a reflectance of 1% or less in the light in the green light band.

As illustrated in FIGS. 12A and 12B, for a sample having a vertical retardation of the retardation plate of 180 nm, a high contrast ratio of 6,074:1 was obtained. This shows that even in a small optical system of F#=2.5, a high contrast can be realized. At this time, it is found that such a high contrast was obtained because a relationship between a retardation Rnc of the retardation plate with respect to incident light in a direction inclined at n degrees and a retardation Rnp of the liquid crystal panel with respect to the incident light in a direction inclined at n degrees was close to Rnc+Rnp=0 (−20<n<20).

In an optical engine in the projection image display apparatus described above, since several tens of millions lux light is incident on the retardation compensating plate 50, high heat resistance and light resistance are required. Therefore, preferably, it may have temperature dynamic properties in which the difference between an in-plane retardation of the retardation plate at room temperature (25° C.) (Re25) and that at 80° C. (Re80) is small, for example, 2 nm or less.

Figure 13A:
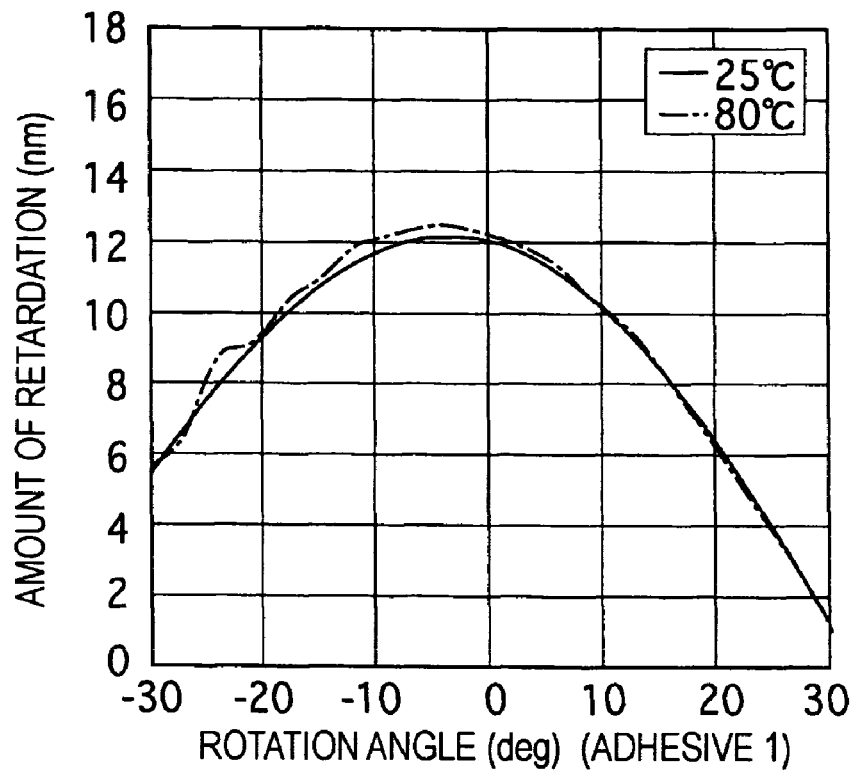
FIGS. 13A and 13B shows the retardation compensation properties of retardation compensation plates produced by using two kinds of adhesives with different differences between an in-plane retardation of a retardation plate at room temperature and that at 80° C.
Figure 13B:
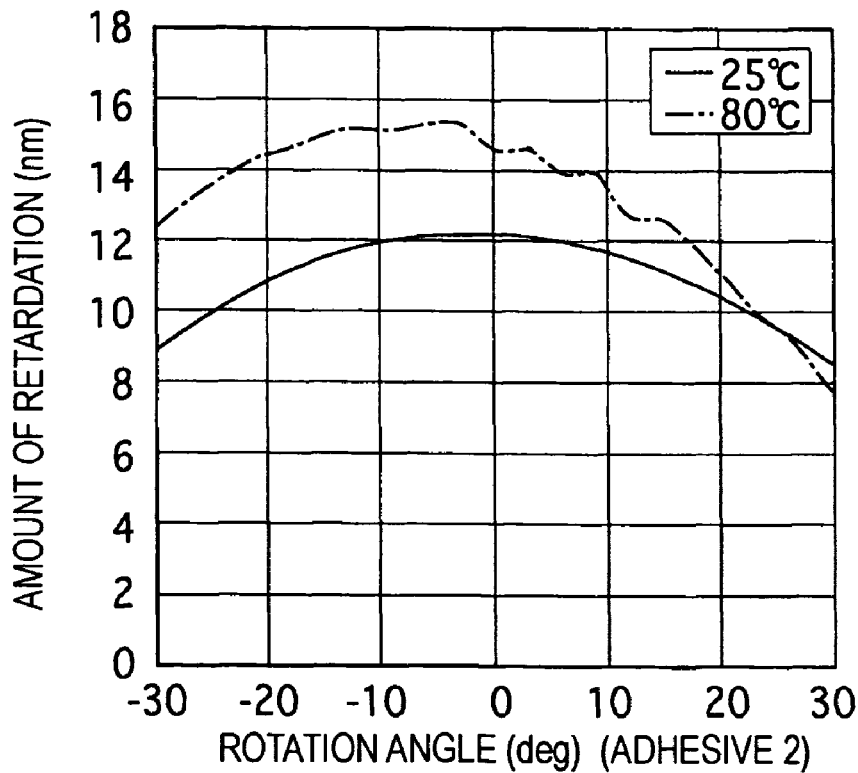

The temperature dynamic properties are dependent on the thermal properties, photoelastic coefficient of a used film, the relationship in expansion coefficient between a support, the film, and an adhesive layer. In particular, since the adhesive layer, which bonds the retardation plate and the transparent support supporting the retardation plate, are prone to exhibit anisotropy dependent on the shape resulting from stress caused by heat, preferably, the adhesive layer may have a refractive index whose change with the stress is small. FIGS. 13A and 13B illustrate the thermal properties of two kinds of samples produced using adhesives 1 and 2. FIG. 13A illustrates the relationship between the rotation angle of the slow axis of a retardation compensating plate produced using the adhesive 1 with respect to the slow axis of the liquid crystal panel and the amount of compensated retardation, and FIG. 13B illustrates the relationship between the rotation angle of the slow axis of a retardation compensating plate produced using the adhesive 2 with respect to the slow axis of the liquid crystal panel and the amount of compensated retardation. Table 3 shows the properties of the in-plane retardation at room temperature and that at 80° C. and the contrast evaluation results for the adhesives 1 and 2.

As shown in Table 3, a sample using the adhesive 1 had little difference in the in-plane retardation between 25° C. and 80° C. For a sample using the adhesive 2, the difference in the in-plane retardation between 25° C. and 80° C. was 3.5 nm. The contrast evaluation results for the samples were that the initial contrast for the sample using the adhesive 1 and that for the adhesive 2 were equal to each other, but the contrast for the sample using the adhesive 2 decreased with time. Therefore, preferably, the retardation plate used as the retardation compensating plate may have temperature dynamic properties in which the difference between an in-plane retardation thereof at room temperature (Re25) and that at 80° C. (Re80) is small, for example, 2 nm or less.

[Retardation Compensating Plate]

The details of the birefringence layer 53 which provides a function of compensating for retardation performed by the retardation compensating plate 50 are specifically explained below.

The birefringence layer 53 is a retardation plate constructed of a laminated structure of two or more retardation films. The in-plane optic axis (slow axis) of at least one of the films is combined in a different direction with respect to the other films, and the in-plane retardation of the laminated structure as a whole is 30 nm or less. This arrangement allows a minute in-plane retardation to be stably acquired with high accuracy.

If the retardation plate is produced using one retardation film, its retardation may not be capable of matching a necessary retardation. In contrast, the present invention can acquire a target retardation with high accuracy because the retardation can be freely adjusted by the use of a plurality of retardation films. For example, in the case in which films, each having an in-plane retardation of 50 nm, are used, a retardation plate having a retardation of 10 nm can be acquired by laminating the retardation films such that the orientation (angle) of the optic axis of each film is displaced from one another. In the case where two retardation films, one having a retardation of 45 nm and the other having a retardation of 50 nm, are used, a retardation plate having a retardation of 10 nm can be acquired by laminating the retardation films while adjusting the angle of the optic axis of each film. Therefore, even when retardation films having different retardations are used, a certain amount of retardation can be acquired.

Specifically, when two films, each having an in-plane retardation of 50 nm, are used and laminated, a retardation plate having an in-plane retardation of 100 nm can be acquired by laminating the films such that the slow axis and the fast axis of a first layer and those of a second layer are arranged in the same directions, respectively. When these films are laminated such that the orientation thereof is rotated 90 degrees so that the slow axis of the first layer matches the fast axis of the second layer, a retardation plate having an in-plane retardation of 0 nm can be acquired. As a result, rotating the films a lamination angle in the range of 0 to 90 degrees enables the in-plane retardation to be adjusted in the range of 0 to 100 nm. As another embodiment, when two kinds of retardation films, one having an in-plane retardation of 45 nm and the other having an in-plane retardation of 50 nm, are used, a lamination angle of the films in the range of 0 to 90 degrees enables the in-plane retardation to be adjusted in the range of 5 to 90 nm. Therefore, a minute amount of retardation required for compensating for residual retardation of the liquid crystal panel, for example, 30 nm, 10 nm, 5 nm, 2 nm, or the like can be readily acquired.

As described above, the in-plane retardation of the laminated structure of the retardation films constituting the birefringence layer 53 is equal to or smaller than the sum total of the in-plane retardations of the retardation films. As a result, a target in-plane retardation R0c of the retardation plate and the sum total of the in-plane retardations of the retardation films, $R0c1, R0c2, \ldots, R0cn$ ($n \geq 2$) satisfy the following relationship:

$$R0c \leq R0c1 + R0c2 + \ldots + R0cn$$

The birefringence layer 53 has negative vertical retardation in order to compensate for retardation of homeotropic liquid crystal molecules with respect to oblique incident light. Since the homeotropic liquid crystal molecules provide retardation with respect to the oblique incident light, the plane of polarization of the incident light is rotated and thus the contrast decreases. The retardation of the liquid crystal molecules increases as the direction of incidence of the incident light is inclined from a vertical direction to a parallel direction to the panel face. To avoid such a decrease in the contrast, the retardation compensating plate 50 having negative vertical retardation is necessary. Therefore, the retardation compensating plate 50 is set such that the refractive index in the vertical direction is smaller than the mean in-plane refractive index ((nx+ny)/2>nz), and the vertical retardation (Rth) of the retardation compensating plate 50 is determined so as to be negative retardation whose amount is the same as that of positive vertical retardation of the liquid crystal panel 11.

The vertical retardation is substantially the same as the sum total of the vertical retardation of a first retardation film and that of a second retardation film. For example, when two retardation films, each having a vertical retardation of −100 nm, are laminated, a retardation plate having a vertical retardation of approximately −200 nm can be acquired. The use of this retardation plate allows a vertical retardation of 200 nm of the liquid crystal panel to be compensated. When two retardation films, each having a vertical retardation of −70 nm, are laminated, a retardation plate having a vertical retardation of approximately −140 nm can be acquired. Moreover, when a film having a vertical retardation of −60 nm is laminated on these films, a retardation plate having a vertical retardation of approximately −200 nm can be acquired.

As described above, the vertical retardation of the laminated structure of the retardation films constituting the birefringence layer 53 is substantially the same as the sum total of the vertical retardations of the retardation films. As a result, a target vertical retardation Rth of the retardation plate and the sum total of the vertical retardations of the retardation films, Rth1, Rth2, . . . , Rthn (n≧2) satisfy the following relationship:

$$Rth \approx Rth1 + Rth2 + \ldots + Rthn$$

As a retardation film from which the retardation plate (birefringence layer 53) is formed, preferably, a material may be used that has properties of heat resistance, low water absorption, low photoelastic coefficient, and the like, and has small variations in the amount of retardation. Examples of a film that bears these required properties include a polymeric film, such as a norbornene-based film, polycarbonate (PC) film, cellulose triacetate film, polymethyl methacrylate (PMMA) film, and the like. Among these films, a norbornene-base film has excellent properties. The polymeric film may be an uniaxially stretched film or a biaxially stretched film. The birefringence layer 53 is not limited to the polymeric film. The birefringence layer 53 may be a cured layer after a coat-type polymeric material is uniformly applied on a support.

The method for bonding the retardation films included in the retardation plate together is not limited to a particular method. Bonding using any one of a pressure-sensitive adhesive (e.g., an adhesive agent or an adhesive sheet) and various adhesives such as a light-curable resin and a thermosetting resin is applicable. An acrylic resin, epoxy resin, other resin are applicable, but the acrylic resin may be preferable in view of optical properties such as transparency. Preferably, the retardation plate may be bonded to a transparent support by using the adhesive described above.

Preferably, the refractive index of the cured adhesive may be substantially the same as that of the film used in the retardation plate or may be between that of the film and that of the transparent support. Preferably, the coefficient of thermal expansion of the cured adhesive may be substantially the same as that of the film used in the retardation plate or may be between that of the film and that of the transparent support.

In addition to this, since the retardation plate is exposed to irradiation of high intensity light inside the projection image display apparatus, a capability of being resistant to an increase in temperature is required as well as light resistance. To address this, in this embodiment, the physical properties of the adhesive are defined below.

First, the glass transition point (Tg) of the adhesive is set at 50° C. or higher, preferably, 60° C. or higher. Since the retardation plate is exposed to a temperature of approximately 50° C. inside the projection image display apparatus, the stability of properties at high temperatures is important. In particular, the change in retardation in high-temperature environments is a problem to be solved. To address this problem, a capability that has no trouble and is stable in actual use environment can be acquired by the use of an adhesive whose Tg is 50° C. or higher. If a retardation plate produced using an adhesive whose Tg is smaller than 50° C. is heated to 50° C., the retardation would be changed, so it is undesired in view of properties. Unlike this, a retardation plate produced using an adhesive whose Tg is equal to or higher than 50° C. exhibits excellent properties of stable retardation even when it is heated to 50° C.

A cause of changing retardation at high temperatures is described below. When the retardation plate is heated to a high temperature and the temperature exceeds Tg of the adhesive, molecules of the adhesive are reoriented. In addition to this, since the adhesive bonds materials having different coefficients of thermal expansion together, when it is heated, stress resulting from the shape of the retardation plate is applied on the adhesive, so that anisotropy of molecular orientation occurs. This is considered as one reason why the retardation changes at high temperatures.

Since an increase in Tg of the adhesive extends a temperature range for allowing the properties to be stable, Tg of the adhesive is required to be selected so as to adjust to the actual use environment.

Second, the thickness of the adhesive is set at 2 µm or more. More preferably, the thickness of the adhesive may be set at 3 µm or more. If the thickness of the adhesive is smaller than 2 µm, sufficient adhesion cannot be acquired, so that the retardation plate peels off at the interface when being exposed to high temperatures.

Third, an adhesive whose cure shrinkage is 10% or less, preferably, 8% or less, is used. This allows good adherability. If an adhesive whose cure shrinkage exceeds 10% is used, the support, which is a quartz or optical glass, is deformed, so that a crack is apt to appear. Methods to reduce the influence of cure shrinkage of the adhesive include a method in which the curing rate of the adhesive is set at low speed and a method in which the adhesive is cured while being heated.

Fourth, the same kind of adhesive is used for bonding the retardation films together and boding the retardation film and the transparent support. The use of the adhesive of the same kind enables a bonding process to be performed collectively. For example, in the case in which the gap between the films and the gap between the film and the transparent support are bonded together by applying the same light-curable resin thereon, all adhesive layers can be cured at one time, thereby allowing the process to be simplified. The use of a pressure-sensitive adhesive, light-curable adhesive, or thermosetting adhesive enables a retardation plate that has stable properties with small variations to be manufactured.

For the light-curable resin (adhesive), a visible-light-curable adhesive can reduce residual deformation after curing, compared with a UV-curable adhesive, and thus has an advantage of suppressing the occurrence of non-uniformity in in-plane retardation of a manufactured retardation plate.

For the laminated structure of norbornene-based films, a film may peel off in high-temperature environment. Causes of peeling include softening of the adhesive layer and a mismatch in the coefficient of thermal expansion between the adhesive layer and the film. To address this, fusing the films together using a solvent containing at least one of toluene, methyl ethyl ketone, methyl isobutyl ketone, acetone, cyclohexane, xylene, and ethyl ether is suitable. In this case, since a film top layer dissolves, the variations in retardation may be caused depending on manufacturing conditions, such as the amount of the solvent. Therefore, the solvent is required to be diluted with ethyl alcohol in case of necessity.

As another bonding using a solvent, an adhesive containing at least one of toluene, methyl ethyl ketone, methyl isobutyl ketone, acetone, cyclohexane, xylene, and ethyl ether can be used. This can increase an affinity between the film and the adhesive layer, and therefore, strong bonding can be acquired.

Moreover, a low glass transition point (Tg) of each laminated retardation film is undesired because the retardation may change in high-temperature environment. For example, a retardation plate produced using a polycarbonate film whose Tg is 150° C. changes the retardation after being exposed to a high temperature of approximately 130° C. If a norbornene-base film whose Tg is 160° C. is used, the retardation does not change at 130° C., so that a stable capability can be acquired. This allows the properties to be stable even in harsh high-temperature environment, such as an optical system of a liquid crystal projector.

Furthermore, poor dimensional stability of each laminated retardation film in high temperature and humidity environments is undesired because the retardation may change in the high temperature and humidity environments. For example, if a polycarbonate film having poor dimensional stability in high temperature and humidity environments is used, the retardation changes after it is exposed to an environment of 60° C. and 90% relative humidity for 100 hours. If a norbornene-based film having high dimensional stability is used, the retardation does not change after it is exposed to such an environment, so that a stable capability can be acquired. This allows the properties to be stable even in harsh high-temperature environment, such as an optical system of a liquid crystal projector.

The rate of dimensional change of a polycarbonate film after it is stored at 60° C. and 90% RH for 100 hours is 0.2%, whereas that of a norbornene-based film is 0.02% or less.

[Method for Producing Retardation Compensating Plate]

A method for producing a retardation plate including the birefringence layer 53 having the structure described above is described below.

The method for producing a retardation plate includes a step of preparing a plurality of retardation films and a step of determining the angle of the optic axis of each of the retardation films to be laminated and the number of retardation films so that each of the in-plane retardation and vertical retardation when the retardation films are laminated is at a desired value.

For example, the method includes a step of preparing a first retardation film and a second retardation film, a step of rotating the optic axis of the second retardation film over a range of predetermined angles with respect to the optic axis (slow axis) of the first retardation film and obtaining a data profile of the amount of in-plane retardations corresponding to each rotation angle, and a step of combining the optic axes at a rotation angle that allows a target in-plane retardation on the basis of the obtained data profile and laminating the first retardation film and the second retardation film. The vertical retardation of the retardation plate is substantially the same as the sum total of the vertical retardation of the first retardation film and that of the second retardation film.

Figure 14A:
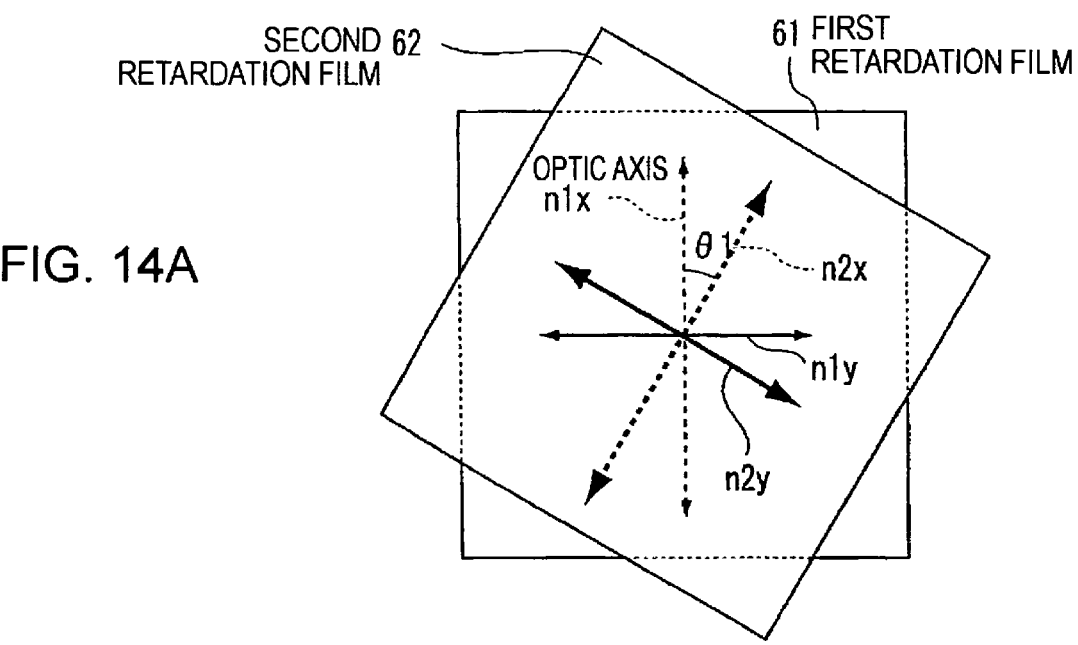
FIGS. 14A and 14B are illustration for explaining one specific example of a method for producing a retardation plate including a birefringence layer, illustrating the direction of the optic axis (slow axis) of each film in FIG. 14A and illustrating a data profile indicating the relationship between the rotation angle of the optic axis and the amount of retardation of the entire film in FIG. 14B.

FIG. 14A is an illustration for explaining a method for producing a retardation plate including a laminated structure of a first retardation film 61 and a second retardation film 62. The principal in-plane refractive indices of the first retardation film 61 are represented as n1$x$ and n1$y$ and those of the second retardation film 62 are represented as n2$x$ and n2$y$, and n1$x$ and n2$x$ represent the slow axes, i.e., optic axes, of the first and second retardation films 61 and 62, respectively, and n1$y$ and n2$y$ represent the fast axes of the first and second retardation films 61 and 62, respectively.

As the first and second retardation films 61 and 62, various commercially available polymeric films can be used. The amounts of in-plane retardations of the first and second retardation films 61 and 62 may be the same or different from each other. Here, as each of the first and second retardation films 61 and 62, a film having an amount of in-plane retardation of 7 nm is used.

In designing the retardation plate, first, the optic axis n1$x$ of the first retardation film 61 and the optic axis n2$x$ of the second retardation film 62 are arranged in the same direction. Next, the second retardation film 62 is rotated 90 degrees in a plane with respect to the first retardation film 61, and the amount of in-plane retardation of the films as a whole corresponding to a rotation angle of θ1 is measured, thereby obtaining a data profile 60, which indicates the relationship between the rotation angle θ1 and the amount of in-plane retardation, as illustrated in FIG. 14B.

Figure 14B:
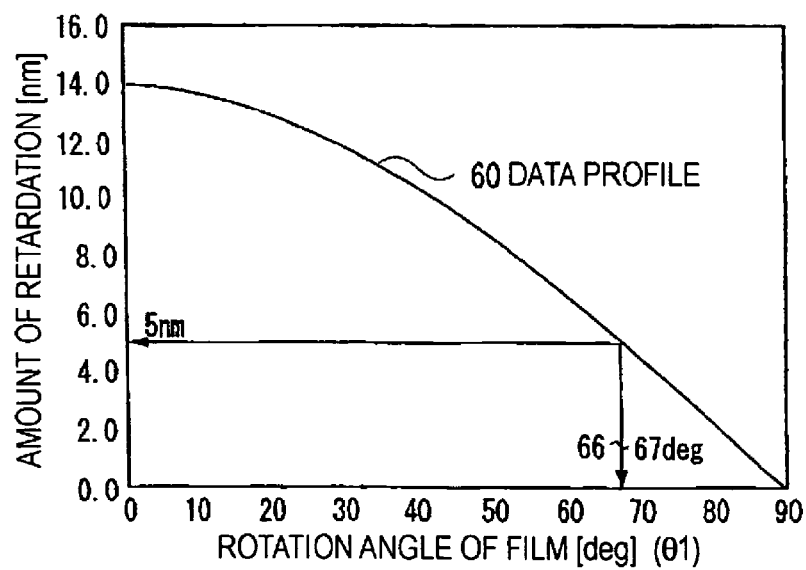

As illustrated in FIG. 14B, as the rotation angle θ1 of the second retardation film 62 with respect to the first retardation film 61 increases, the amount of in-plane retardation of the films as a whole decreases like a trigonometric function. Here, when θ1 is zero, i.e., when the slow axes n1$x$ and n2$x$ of the first and second retardation films 61 and 62 are oriented in the same direction, the amount of retardation of the films as a whole is the sum total of the amounts of the retardation films (7 nm+7 nm=14 nm). When θ1 is 90 degrees, i.e., when the slow axis n1$x$ of the first retardation film 61 is orthogonal to the slow axis n2$x$ of the second retardation film 62, the amount of retardation as a whole is the difference between the amounts of the retardation films (7 nm−7 nm=0). The amount of retardation can be freely adjusted by changing the angle of the optic axis of a laminated film.

The data profile 60 of the amount of retardation created as described above is referenced for determining the rotation angle θ1 to obtain a target amount of retardation. For example, to produce a retardation plate whose amount of retardation of the films as a whole is 5 nm, the rotation angle θ1 corresponding to an amount of retardation of 5 nm (in this example, 66 to 67 degrees) is determined, and then the first and second retardation films 61 and 62 are integrally laminated such that the optic axes n1$x$ and n2$x$ are combined so as to satisfy the determined rotation angle θ1. As a method for laminating, bonding using the adhesive described above or fusing using a solvent is used.

Figure 15:
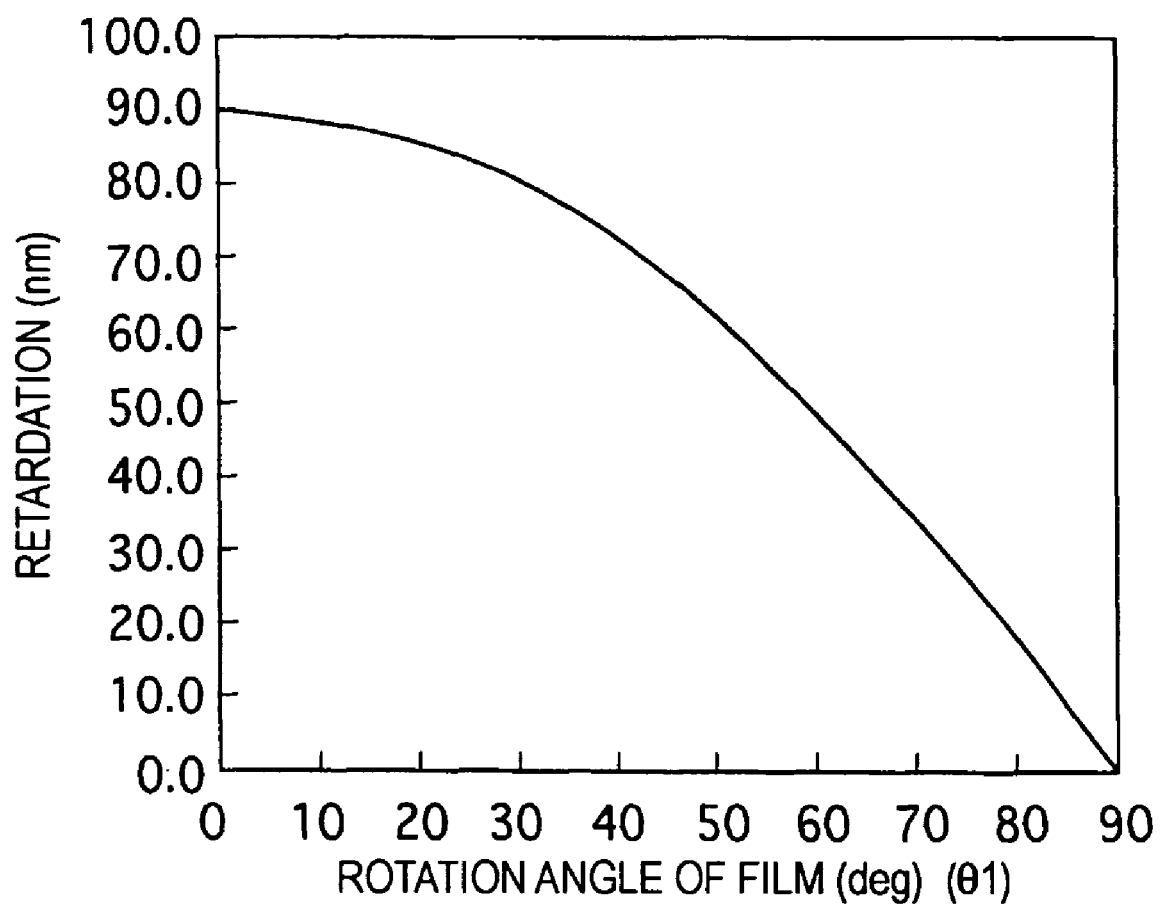
FIG. 15 is an illustration for explaining another specific example of the method for producing a retardation plate including a birefringence layer, illustrating a data profile indicating the relationship between the rotation angle and the amount of retardation of the entire film.

FIG. 15 illustrates a data profile that indicates the relationship between the rotation angle θ1 and the amount of in-plane retardation obtained when a retardation film having an amount of in-plane retardation of 45 nm is used as each of the first and second retardation films 61 and 62 illustrated in FIG. 14A. For example, to produce a retardation plate whose amount of in-plane retardation of the films as a whole is 20 nm, the rotation angle θ1 corresponding to an amount of retardation of 20 nm (in this example, approximately 78 degrees) is determined, and then the first and second retardation films 61 and 62 are integrally laminated such that the optic axes n1x and n2x are combined so as to satisfy the determined rotation angle θ1. As a method for laminating, bonding using the adhesive described above or fusing using a solvent is used.

Figure 16A:
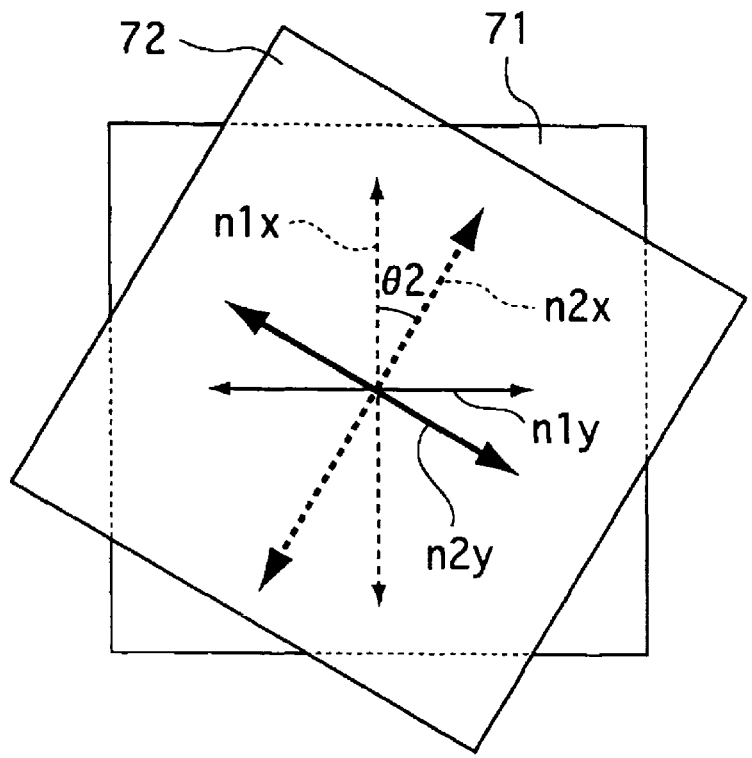
FIGS. 16A and 16B are illustrations for explaining still another specific example of the method for producing a retardation plate including a birefringence layer, showing the direction of the optic axis (slow axis) of each film in FIG. 16A and showing a data profile indicating the relationship between the rotation angle of the optic axis and the amount of retardation of the entire film in FIG. 16B.
Figure 16B:
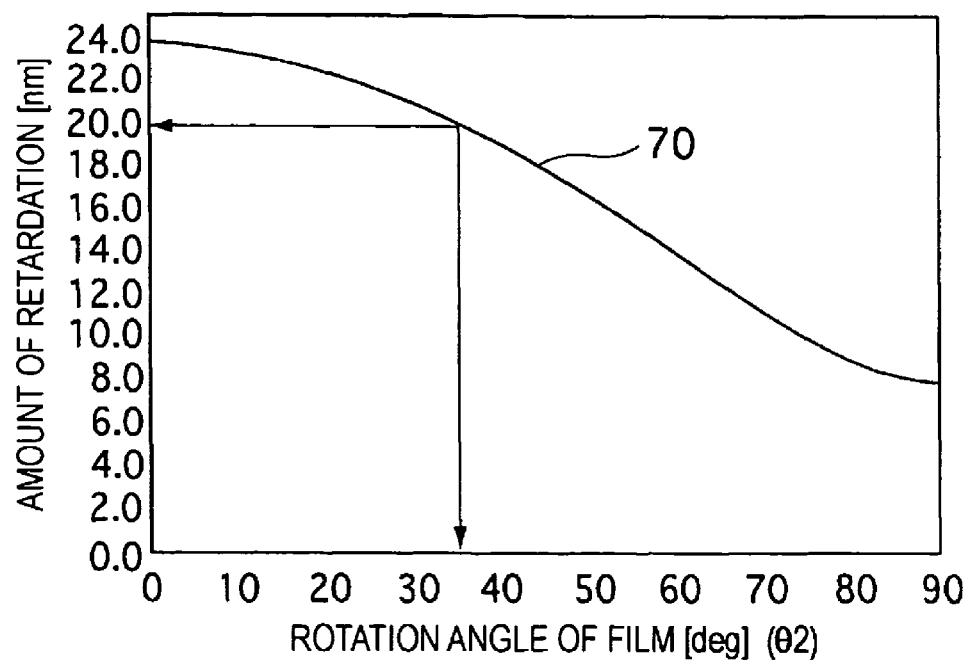

Aside from production of retardation plate using two retardation films, production of a retardation plate having a target amount of in-plane retardation using three or more retardation films can be performed. FIGS. 16A and 16B are illustrations for explaining a method for producing a retardation plate constructed of a laminated structure of three retardation films. In this example, a case in which a single-layer second retardation film 72 is laminated on a double-layer first retardation film 71 so as to allow the amount of in-plane retardation of the films as a whole to be 20 nm. The retardation films have the same amount of in-plane retardation of 8 nm.

As is the case with the example of FIG. 14A, the principal in-plane refractive indices of the first retardation film 71 are represented as n1x and n1y and those of the second retardation film 72 are represented as n2x and n2y, and n1x and n2x represent the slow axes, i.e., optic axes, of the first and second retardation films 71 and 72, respectively, and n1y and n2y represent the fast axes of the first and second retardation films 71 and 72, respectively.

In designing the retardation plate, first, the optic axis n1x of the first retardation film 71 and the optic axis n2x of the second retardation film 72 are arranged in the same direction. In this example, the first retardation film 71 is a laminated structure of two retardation subfilms, each having an amount of in-plane retardation of 8 nm, and in the laminated structure, the optic axis of one retardation subfilm matches that of the other. Therefore, the amount of in-plane retardation of the first retardation film 71 is 16 nm.

Next, the second retardation film 72 is rotated 90 degrees in a plane with respect to the first retardation film 71, and the amount of in-plane retardation of the films as a whole corresponding to a rotation angle of θ2 is measured, thereby creating a data profile 70, which indicates the relationship between the rotation angle θ2 and the amount of in-plane retardation, as illustrated in FIG. 16B.

As illustrated in FIG. 16B, as the rotation angle θ2 of the second retardation film 72 with respect to the first retardation film 71 increases, the amount of in-plane retardation of the films as a whole decreases like a trigonometric function. Here, when θ2 is zero, i.e., when the slow axes n1x and n2x of the first and second retardation films 71 and 72 are oriented in the same direction, the amount of retardation of the films as a whole is the sum total of the amounts of the retardation films (16 nm+8 nm=24 nm). When θ2 is 90 degrees, i.e., when the slow axis n1x of the first retardation film 71 is orthogonal to the slow axis n2x of the second retardation film 72, the amount of retardation as a whole is the difference between the amounts of the retardation films (16 nm−8 nm=8 nm).

The data profile 70 of the amount of retardation created as described above is referenced for determining the rotation angle θ2 to obtain a target amount of retardation. For example, to produce a retardation plate whose amount of retardation of the films as a whole is 20 nm, the rotation angle θ2 corresponding to an amount of retardation of 20 nm (in this example, approximately 36 degrees) is determined, and then the first and second retardation films 71 and 72 are integrally laminated such that the optic axes n1x and n2x are combined so as to satisfy the determined rotation angle θ2.

As described above, according to this embodiment, a retardation plate having a minute retardation can be produced using a plurality of retardation films. Forming the birefringence layer 53 of the retardation compensating plate 50 with the retardation plate described above enables the in-plane retardation of each of the liquid crystal display devices 1R, 1G, and 1B for RGB to be compensated with high accuracy. Therefore, the contrast of the projection image display apparatus can be finely adjusted, thus realizing a high contrast of a displayed image.

In the explanation about FIGS. 14A to 16B, for the sake of clarity of rotation geometry, a rectangular retardation film is cited. However, the present invention is not limited to this shape, and a circular retardation film may be used, for example. When a plurality of circular retardation films that have substantially the same diameter are prepared, steps of measuring the retardation of each retardation film, laminating the films, and bonding the films together can be performed while a certain film shape is maintained. Therefore, productivity can be increased, and process control can be facilitated. A laminated structure of films that are bonded together in the form of a circle is then processed into a target size.

[Combination of Retardation Films]

A retardation compensating plate (retardation plate) may have different compensation properties depending on the kinds of individual retardation films included in the retardation compensating plate and a method for combining the films. The details are described below.

The residual retardation of a homeotropic reflective liquid crystal panel is typically 5 nm or less. In this case, to compensate for the residual retardation, a retardation plate having a in-plane retardation (Re) satisfying $1<\text{Rec}/\text{Rep} \leq 10$ and a vertical retardation (Rth) being in neighborhood of 200 nm is necessary, where Rec denotes an in-plane retardation of the retardation compensating plate, like R0c, and Rep denotes an in-plane retardation (residual retardation) of the liquid crystal panel, like R0p.

In the case where the retardation plate is constructed of a single stretched film, since the film has a small in-plane retardation and a large vertical retardation, an advanced technique of control the stretching is required, so that non-uniformity in retardation, variations in the direction of the optic axis, and the like are prone to appear. Therefore, it is difficult to control the retardation properties consistently. In contrast to this, when a retardation plate is constructed of two or more retardation films, each having retardation properties in which the in-plane retardation is larger than a desired residual retardation and the orientation can be readily controlled, and the lamination angle is changed, the in-plane retardation can be controlled.

The retardation of the compensator is set so as to be larger than the residual retardation of the liquid crystal panel ($1<\text{Rec}/\text{Rep} \leq 10$), and therefore, it is used after being rotated such that the residual retardation Rep of the liquid crystal panel is the same as the effective retardation (Rec_eff) of the retardation compensating plate during compensation. The residual retardation of the homeotropic reflective liquid crystal panel is typically 5 nm or less, and therefore, it is important to obtain an effective retardation of 5 nm or less during rotation adjustment of the retardation compensating plate.

For a retardation plate constructed of a single retardation film, the effective retardation with respect to incident light having the direction of polarization parallel to the optic axis (slow axis) of the film is 0 nm and reaches its peak with respect to polarized light that is rotated 45 degrees to the optic axis. As described above, in the case in which the retardation plate is constructed of the single retardation film, the minimum value of the effective retardation can obtain up to 0 nm, so that a minute residual retardation can be compensated.

In contrast to this, in the case of a retardation plate constructed of two or more retardation films laminated while the lamination angle (which is an angle between the optical axes)

is changed, when the lamination angle is 0 or 90 degrees, the minimum value of the effective retardation of the retardation compensating plate can obtains up to 0 nm. However, the minimum value of the effective retardation increases as the lamination angle approaches 45 degrees. In addition, the increment of the minimum value of the effective retardation increases with an increase in the amount of in-plane retardation per one retardation film. When the minimum value of the effective retardation exceeds the residual retardation of the liquid crystal panel, even if the retardation of the compensator satisfies 1<Rec/Rep≦10, because a necessary effective retardation cannot be obtained during rotation adjustment, the residual retardation of the liquid crystal panel may not be sufficiently compensated.

FIG. 17 illustrates the angular dependencies of effective retardation in the case in which two kinds of retardation films, one having an in-plane retardation of 70 nm and the other having an in-plane retardation of 50 nm, are laminated at a lamination angle of 90°, 67.5°, and 45°. In FIG. 17, the horizontal axis indicates the rotation angle of the optic axis of a first retardation film with respect to the optic axis of the liquid crystal panel, and the vertical axis indicates the effective retardation of the retardation plate (laminated structure of retardation films). For the retardation plate, light having the direction of polarization rotated 45 degrees to the optic axis of the liquid crystal panel is incident thereon.

In the case of a lamination angle of 90 degrees, since the optic axis of the laminated plate does not change, the effective retardation reaches its peak when the angle between the optic axis of the liquid crystal panel and that of the retardation plate is 0 and 90 degrees and is minimized when the angle is 45 degrees. When the lamination angle is other than 90 degrees, the optic axis of the retardation plate varies, and therefore, the position for the angle of the retardation plate at which the effective retardation reaches its peak is shifted, compared with a case of 90 degrees.

In the example of FIG. 17, when the lamination angle is 90 degrees, the minimum value of the effective retardation can obtain up to 0 nm. However, when the lamination angle is 67.5 degrees, the minimum value of the effective retardation is 13 nm, and when the lamination angle is 45 degrees, the minimum value of the effective retardation is 19 nm. Therefore, when the retardation plate is constructed at a lamination angle of other than 90 degrees, if the in-plane retardation per one retardation film is large, the residual retardation of the liquid crystal panel, which is typically 5 nm or less, cannot be compensated.

FIG. 18 illustrates the angular dependencies of the effective retardation in the case in which, when two films, each having an in-plane retardation of 5 nm, another two films, each having an in-plane retardation of 50 nm, another two films, each having an in-plane retardation of 100 nm, and another two films, each having an in-plane retardation of 200 nm, are prepared, two films of the same kind are laminated at a lamination angle of 45°. In FIG. 18, similarly, the horizontal axis indicates the rotation angle of the optic axis of a first retardation film with respect to the optic axis of the liquid crystal panel, and the vertical axis indicates the effective retardation of the retardation plate. For the retardation plate, light having the direction of polarization rotated 45 degrees to the optic axis of the liquid crystal panel is incident thereon.

As is evident from FIG. 18, the minimum value of the effective retardation increases with an increase in the in-plane retardation per one retardation film. As a result, when the in-plane retardation of the retardation plate is adjusted at a lamination angle of other than 90 degrees, the use of films in which the retardation per one retardation film is small enables a minute effective retardation.

As described above, for adjusting the in-plane retardation by laminating films, laminating two kinds of films such that the optic axis of one kind of the film is orthogonal to that of the other or using films in which the in-plane retardation per one retardation film is small are preferred embodiments. In the latter case, it is difficult to control the in-plane retardation so as to reduce it into a small value while maintaining a vertical retardation in neighborhood of 200 nm, thus causing an increase in the number of used films. Therefore, a retardation plate in the former case in which films are orthogonally laminated is the most preferable.

To control the in-plane retardation by orthogonally laminating, two retardation films whose difference in the in-plane retardation therebetween is the same as a desired in-plane retardation (1<Rec/Rep≦10) are required. It is preferable that the sum of the vertical retardations of the two retardation films be in neighborhood of 200 nm.

For example, in the case in which uniaxially stretched films are orthogonally laminated, the vertical retardation is half the in-plane retardation, and therefore, an in-plane retardation of the order of 200 nm is necessary for each of the films. As a result, in the case in which the uniaxially stretched films are used, a large in-plane retardation is required for each of the films. However, if the directions of the optic axes of the films vary and/or the lamination angle is displaced from 90 degrees because of error in measurement accuracy or bonding accuracy, since the in-plane retardation per one film is large, the minimum value of the effective retardation is largely increased. As a result, the residual retardation of the liquid crystal panel is not likely to be sufficiently compensated.

In the case where biaxially stretched films are orthogonally laminated, it is possible to maintain that the vertical retardation is larger than the in-plane retardation and to reduce the in-plane retardation to less than 100 nm. Therefore, even if the directions of the optic axes of the films vary and/or the lamination angle is displaced from 90 degrees because of error in measurement accuracy or bonding accuracy, the minimum value of the effective retardation can be reduced to the residual retardation of the panel or less.

For the reasons described above, the retardation compensating plate can obtains the most stable compensation properties by being constructed by orthogonally laminating the biaxially stretched films.

EXAMPLES

Examples of the present invention are describe below. The present invention is not limited to these examples.

Examples 1 to 4

The amount of compensated retardation with respect to the liquid crystal panel when the slow axis of a retardation compensating plate according to the examples and comparative examples is rotated was measured as follows. The rotations were performed clockwise using as 0 degrees an angle at which the slow axis R1 of the liquid crystal panel matches the slow axis R2 of the retardation compensating plate (see FIGS. 8 and 9). The in-plane retardation (R0p) of the liquid crystal panel was determined as 2.5 nm.

Example 1

A retardation compensating plate having an in-plane retardation (R0c) of 12 nm was prepared. The changes occurring when the slow axis R2 of the retardation compensating plate was rotated with respect to the slow axis R1 of the liquid crystal panel were measured ($R0c/R0p=4.8$).

Comparative Example 1

A retardation compensating plate having an in-plane retardation ($R0c$) of 30 nm was prepared. The changes occurring when the slow axis R2 of the retardation compensating plate was rotated with respect to the slow axis R1 of the liquid crystal panel were measured ($R0c/R0p=12$).

Figure 19:
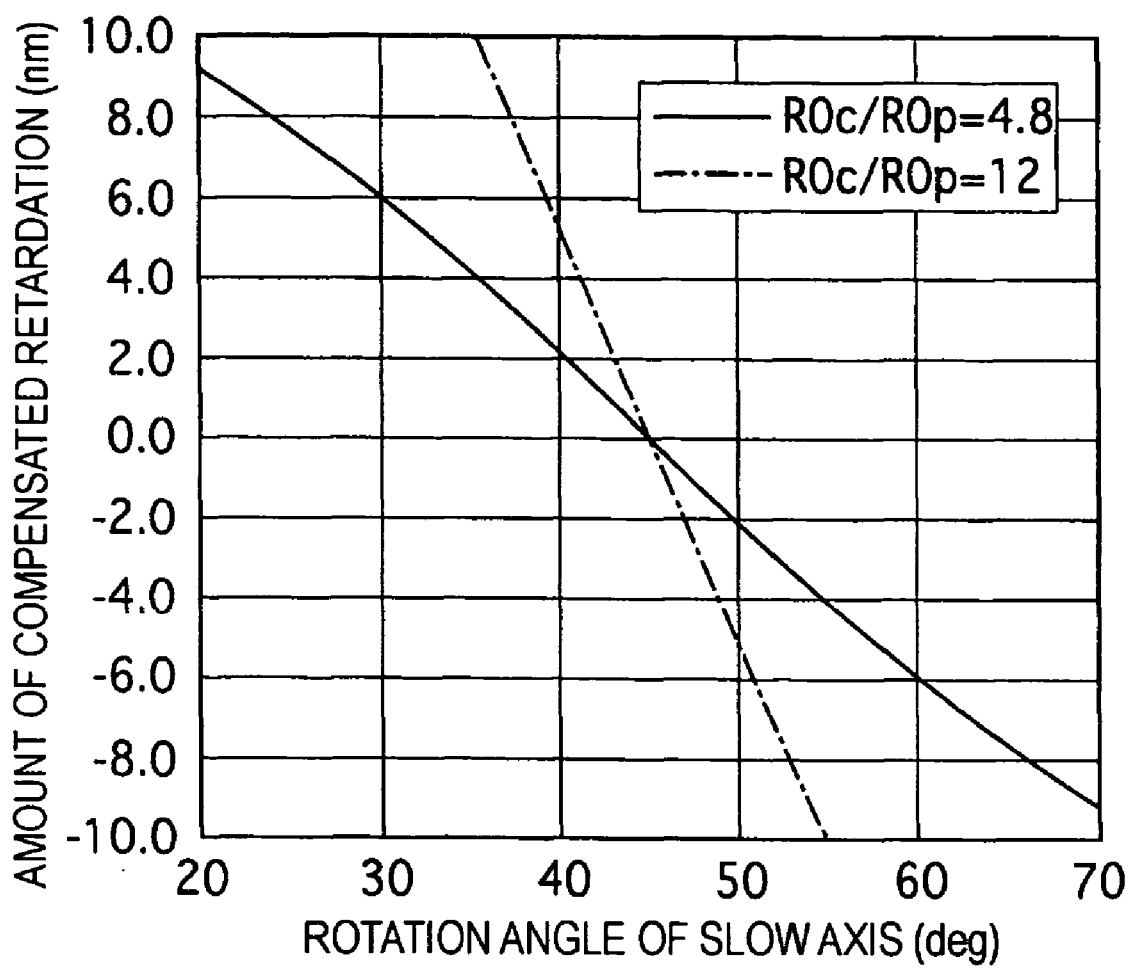
FIG. 19 illustrates the changes of the amount of compensated retardation with respect to the rotation angle according to Example 1.

FIG. 19 illustrates the results of the measured amounts of compensated retardation according to Example 1 and Comparative Example 1. When the in-plane retardation $R0p$ of the liquid crystal panel is 2.5 nm, the amount of compensated retardation of the retardation compensating plate is required to be −2.5 nm. As illustrated in FIG. 19, the following is found.

In Comparative Example 1, since the changes in the amount of compensated retardation with respect to the rotation of the slow axis are large, to acquire an amount of compensated retardation of the order of −2.5 nm, the slow axis R2 is required to be set with an accuracy of ±0.5 degree or less. It is therefore found that the optimization of the contrast is difficult. It is found that, if the direction of the slow axis R2 is displaced, since the amount of compensated retardation largely changes, the compensation properties largely decrease.

In contrast, in Example 1, to acquire an amount of compensated retardation of the order of −2.5 nm, rotating the slow axis R2 approximately 51 degrees is merely required, the changes in the amount of compensated retardation with respect to the rotation are small, and therefore, rotating the slow axis R2 enables the contrast to be finely adjusted readily. In addition, the contrast can be compensated in a range of ±2 nm, the variations among liquid crystal panels and the variations in the angle of placing another optical part can be accommodated. Furthermore, it is found that, if the direction of the slow axis R2 is displaced, a decrease in the amount of compensated retardation is small.

Examples for examining the relationship between the in-plane retardation $R0c$ of the retardation compensating plate and the in-plane retardation $R0p$ of the liquid crystal panel are described below.

Example 2

A retardation compensating plate having an in-plane retardation ($R0c$) of 20 nm was prepared. The changes occurring when the slow axis R2 of the retardation compensating plate was rotated with respect to the slow axis R1 of the liquid crystal panel were measured ($R0c/R0p=8$).

Example 3

A retardation compensating plate having an in-plane retardation ($R0c$) of 9 nm was prepared. The changes occurring when the slow axis R2 of the retardation compensating plate was rotated with respect to the slow axis R1 of the liquid crystal panel were measured ($R0c/R0p=3.6$).

Example 4

A retardation compensating plate having an in-plane retardation ($R0c$) of 6 nm was prepared. The changes occurring when the slow axis R2 of the retardation compensating plate was rotated with respect to the slow axis R1 of the liquid crystal panel were measured ($R0c/R0p=2.4$).

Comparative Example 2

A retardation compensating plate having an in-plane retardation ($R0c$) of 2.5 nm was prepared. The changes occurring when the slow axis R2 of the retardation compensating plate was rotated with respect to the slow axis R1 of the liquid crystal panel were measured ($R0c/R0p=1$).

Figure 20:
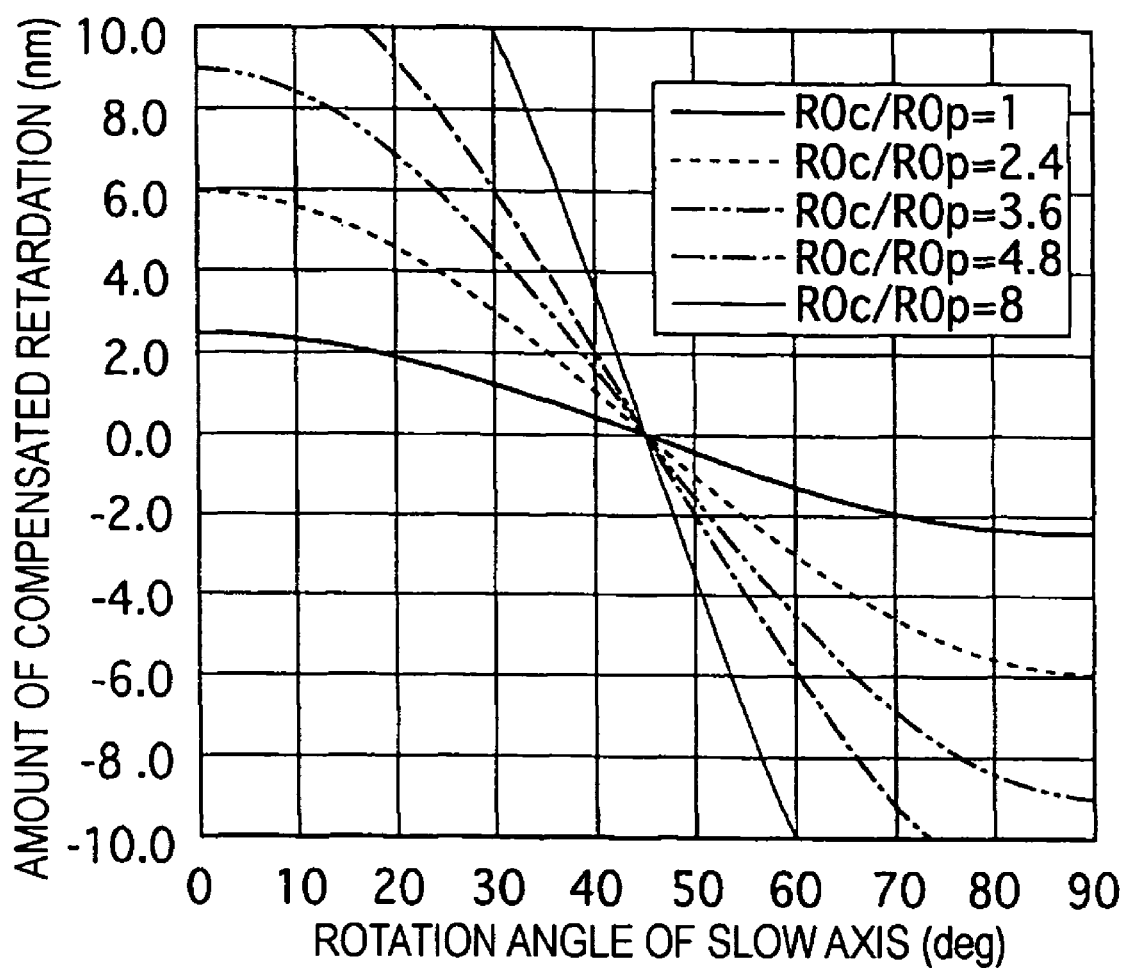
FIG. 20 illustrates the changes of the amount of compensated retardation with respect to the rotation angle according to Examples 1 to 3.

FIG. 20 illustrates the results of the measured amounts of compensated retardation according to Examples 1 to 4 and Comparative Example 2. As illustrated in FIG. 20, in Comparative Example 2, in which $R0c/R0p=1$, an amount of compensated retardation of the order of −2.5 nm can be acquired by rotating the slow axis R2 of the retardation compensating plate approximately 85 degrees with respect to the slow axis R1 of the liquid crystal panel. There are few variations in the amount of compensated retardation with respect to changes in the position of the axis, and the contrast compensation can be stably performed. However, if the in-plane retardation of the liquid crystal panel is varied from 2.5 nm, it is necessary to largely adjust the rotation angle ±10 degrees or more, so that a necessary amount of compensated retardation may not be acquired. In addition, it is difficult to provide a rotating mechanism for rotating the retardation compensating plate up to the range of ±10 degrees or more in view of a construction of mounting the retardation compensator on the liquid crystal panel.

In contrast, in Example 1, in which $R0c/R0p=4.8$, an amount of compensated retardation of approximately −2.5 nm can be acquired by rotating the slow axis R2 of the retardation compensating plate approximately 51 degrees with respect to the slow axis R1 of the liquid crystal panel. The equivalent amount of compensated retardation can be acquired by rotating it approximately 49 degrees in Example 2, in which $R0c/R0p=8$, approximately 53 degrees in Example 3, in which $R0c/R0p=3.6$, and approximately 57 degrees in Example 4, in which $R0c/R0p=2.4$. The variations in the amount of compensated retardation with respect to the changes in the position of the axis are larger than a case of $R0c/R0p=1$, but they are not as large as Comparative Example 1, so that the influence on the contrast is small. In addition, it is possible to adjust the amount of compensated retardation larger and smaller than −2.5 nm, so that the optimization of liquid crystal panels having variations in the amount of retardation can be performed. Moreover, variations in the amount of retardation of the liquid crystal panel can be accommodated within the range of ±10 degrees of the rotation adjusting angle or less, for example, ±5 degrees or less.

As described above, the in-plane retardation $R0c$ of the retardation compensator is adjusted so as to satisfy a relationship of $1<R0c/R0p$, more preferably, $2 \leq R0c/R0p$, thereby allowing the amount of the in-plane retardation of the liquid crystal panel to be compensated with high accuracy and enabling the contrast to be adjusted readily.

If $10<R0c/R0p$, the changes in the amount of compensated retardation with the changes in the angle of the slow axis R2 are increased, and therefore, fine adjustment is difficult. If $10 \geq R0c/R0p$, the influence on the contrast is reduced.

Examples 5 to 7

Example 5

Two non-stretched norbornene-based films, each having a thickness of 188 μm and 7 nm in-plane retardation, were used as retardation films, and the two films were bonded together such that the angle between the optic axis of a first layer and that of a second layer were adjusted on the basis of a previously obtained data profile (indicating the relationship between the lamination angle of the amount of retardation) so that the 10 nm in-plane retardation obtained after the films were laminated. The measurement of the retardation was performed using RETS-100 from Otsuka Electronics Co., Ltd. For bonding the films, a visible-light-curable resin was used.

Next, two quartz glasses were used as supports, and antireflection layers were formed on first faces of the two glasses. The antireflection layers were formed by sputtering. Then, a laminated structure of the laminated films was sandwiched between the supports on which the antireflection layers were formed, and they were bonded together. A visible-light-curable resin was used in bonding. As a result, a retardation plate having an in-plane retardation of 10 nm and a reflectance of 1% or less was obtained.

As a result of maintaining the bonded films at high temperatures to examine heat resistance of bonding, the films did not peel off up to at 140° C. The in-plane retardation was measured after the retardation plate was maintained in an environment of 130° C. for 1 hour and then retrieved therefrom to check heat resistance of the produced retardation plate. As a result of the measurement, the in-plane retardation remained unchanged at 10 nm, and excellent properties were obtained.

Example 6

A retardation plate was produced in the same manner as that in Example 5, except that the films were fused together using a solvent to bond the films together. As the solvent for fusing, toluene was used. The produced retardation plate obtained properties of an in-plane retardation of 10 nm and a reflectance of 1% or less.

As a result of maintaining the bonded films at high temperatures to examine heat resistance of bonding, the films did not peel off even at 170° C., which exceeded the glass transition point of the films, and an excellent heat resistance was obtained. The in-plane retardation was measured after the retardation plate was maintained in an environment of 130° C. for 1 hour and then retrieved therefrom to check heat resistance of the produced retardation plate. As a result of the measurement, the in-plane retardation remained unchanged at 10 nm, and excellent properties were obtained.

Example 7

In order to compensate for the in-plane retardation of the liquid crystal panel and further improve the contrast of the projection image display apparatus, it is preferable to compensate for the vertical retardation, in addition to the in-plane retardation. As one example of the retardation plate for compensating for the in-plane retardation and the vertical retardation of the liquid crystal panel, an example of producing a retardation plate having an in-plane retardation of 10 nm and a vertical retardation of −200 nm is shown below.

Four non-stretched norbornene-based films, each having a thickness of 188 μm and 7 nm in-plane retardation, were used as retardation films, and the films were bonded together such that the angles of the optic axes of first to fourth layers were adjusted so that the in-plane retardation was 10 nm and the vertical retardation was −200 nm.

Next, two quartz glasses were used as supports, and antireflection layers were formed on first faces of the two glasses. The antireflection layers were formed by sputtering. Then, a laminated structure of the laminated films was sandwiched between the supports on which the antireflection layers were formed, and they were bonded together. For bonding the films, a visible-light-curable resin was used. As a result, a retardation plate having an in-plane retardation of 10 nm and a vertical retardation of −200 nm was obtained.

As a result of maintaining the bonded films at high temperatures to examine heat resistance of bonding, the films did not peel off even at 170° C., which exceeded the glass transition point of the films, and an excellent heat resistance was obtained. The in-plane retardation was measured after the retardation plate was maintained in an environment of 130° C. for 1 hour and then retrieved therefrom to check heat resistance of the produced retardation plate. As a result of the measurement, the in-plane retardation remained unchanged at 10 nm and the vertical retardation remained unchanged at −200 nm, and excellent properties were obtained.

Comparative Example 3

To compare the heat resistance of the retardation plate, the retardation plate was produced in the same manner as that in Example 1, except that polycarbonate films whose glass transition point was 150° C. were used. The in-plane retardation was measured after the retardation plate was maintained in an environment of 130° C. for 1 hour and then retrieved therefrom. As a result of this, the in-plane retardation decreased to 3 nm, and the instability of the retardation was confirmed.

Examples 8 to 10

Examples of producing a retardation plate whose in-plane retardation (R0c) is 20 nm and vertical retardation (Rth) is −200 nm are described below.

Example 8

A biaxially stretched norbornene-based film having a thickness of 70 μm, R0c=50 nm, and Rth=−100 nm and a biaxially stretched norbornene-based film having a thickness of 70 μm, R0c=70 nm, and Rth=−100 nm were prepared in the form of a circle as retardation films. The films were bonded together such that the optic axes of the films were orthogonal to each other so that the in-plane retardation obtained after the films were laminated was 20 nm. The measurement of the retardation was performed using RETS-100 from Otsuka Electronics Co., Ltd. For bonding the films, a visible-light-curable resin was used.

Next, two quartz glasses were used as supports, and antireflection layers were formed on first faces of the two glasses. The antireflection layers were formed by sputtering. Then, a laminated structure of the laminated films was sandwiched between the supports on which the antireflection layers were formed, and they were bonded together. The obtained laminated structure was then processed with a slicing machine and reduced to target sizes. As a result of this, a retardation plate having R0c=20 nm, Rth=−200 nm, and a reflectance of 1% or less was obtained.

Example 9

A biaxially stretched norbornene-based film having a thickness of 70 μm, R0c=45 nm, and Rth=−100 nm and a biaxially stretched norbornene-based film having a thickness of 70 μm, R0c=65 nm, and Rth=−100 nm were prepared in the form of a circle as retardation films. The films were bonded together such that the optic axes of the films were orthogonal to each other so that the in-plane retardation obtained after the films were laminated was 20 nm. The measurement of the retardation was performed using RETS-100 from Otsuka Electronics Co., Ltd. For bonding the films, a visible-light-curable resin was used.

Next, two quartz glasses were used as supports, and antireflection layers were formed on first faces of the two glasses. The antireflection layers were formed by sputtering. Then, a laminated structure of the laminated films was sandwiched between the supports on which the antireflection layers were formed, and they were bonded together. The obtained laminated structure was then processed with a slicing machine and reduced to target sizes. As a result of this, a retardation plate having $R0c$=20 nm, Rth=−200 nm, and a reflectance of 1% or less was obtained.

Example 10

The retardation plate was produced in the same manner as that in Example 9, except that the films were fused together using a solvent to bond the films together. As the solvent for fusing, toluene was used. The produced retardation plate obtained properties of R0=20 nm, Rth=−200 nm, and a reflectance of 1% or less.

Comparative Example 4

The retardation plate was produced in the same manner as that in Example 9, except that polycarbonate films were used as retardation films. The produced retardation plate obtained properties of R0=20 nm, Rth=−200 nm, and a reflectance of 1% or less.

[Environmental Testing]

Next, in order to examine the stability of each retardation plate according to Examples 8 to 10 and Comparative Example 4, the retardation was measured after the retardation plate was maintained in an environment of 60° C. and 90% RH for 100 hours. As a result of this, the retardation plate according to each of Examples 8 to 10 did not change the retardation and obtained stable stability. For the retardation plate according to Comparative Example 4, the in-plane retardation before testing was 20 nm, whereas the in-plane retardation after testing was 15 nm. The instability of the properties in high temperature and humidity environments was confirmed.

Example 11

A retardation plate was produced using light-curable resins having different glass transition points. Thereafter, it was stored at 50° C. for 1 day and then retrieved, and the in-plane retardation was measured. The measurement of the retardation was performed using RETS-100 from Otsuka Electronics Co., Ltd. The central portion and a position 5 mm from the corner portion in the retardation plate were measured and compared. The results of the test were shown in Table 4.

The structure of the retardation plate and the method for producing the retardation plate were described below.

A biaxially stretched norbornene-based film having a thickness of 70 μm, $R0c$=50 nm, and Rth=−100 nm and a biaxially stretched norbornene-based film having a thickness of 70 μm, $R0c$=70 nm, and Rth=−100 nm were prepared in the form of a circle as retardation films. The films were bonded together such that the optic axes of the films were orthogonal to each other so that the in-plane retardation obtained after the films were laminated was 20 nm. The measurement of the retardation was performed using RETS-100 from Otsuka Electronics Co., Ltd. For bonding the films, a visible-light-curable resin was used.

Next, two quartz glasses, each having a thickness of 0.3 mm, were used as supports, and antireflection layers were formed on first faces of the two glasses. The antireflection layers were formed by sputtering. Then, a laminated structure of the laminated films was sandwiched between the supports on which the antireflection layers were formed, and they were bonded together. For bonding, a visible-light-curable resin was used. The obtained laminated structure was then processed with a slicing machine and reduced to target sizes. As a result of this, a retardation plate having $R0c$=20 nm, Rth=−200 nm, and a reflectance of 1% or less was obtained.

The amount of the change in the retardation of the retardation plate may preferably be 1 nm or less. As shown in Table 4, for samples A1 and A2 which use adhesives whose Tg is smaller than 50° C., the amount of the change in the retardation at the corner portion exceeds 1 nm. In contrast, for samples A3 to A6 which use adhesives whose Tg is equal to or larger than 50° C., both the central portion and the corner portion are 1 nm or less, so that excellent capabilities can be obtained.

Example 12

Retardation plates including adhesive layers of different thicknesses were produced. Thereafter, to evaluate adhesion of the adhesives, the retardation plate was stored in an environment of 60° C. and 90% RH for 5 days and then retrieved therefrom, and the outward appearance thereof was observed. The results of the test were shown in Table 5.

The structure of the retardation plate and the method for producing the retardation plate were described below.

A biaxially stretched norbornene-based film having a thickness of 70 μm, $R0c$=50 nm, and Rth=−100 nm and a biaxially stretched norbornene-based film having a thickness of 70 μm, $R0c$=70 nm, and Rth=−100 nm were prepared in the form of a circle as retardation films. The films were bonded together such that the optic axes of the films were orthogonal to each other so that the in-plane retardation obtained after the films were laminated was 20 nm. The measurement of the retardation was performed using RETS-100 from Otsuka Electronics Co., Ltd. For bonding the films, a visible-light-curable resin was used.

Next, two quartz glasses, each having a thickness of 0.3 mm, were used as supports, and antireflection layers were formed on first faces of the two glasses. The antireflection layers were formed by sputtering. Then, a laminated structure of the laminated films was sandwiched between the supports on which the antireflection layers were formed, and they were bonded together. For bonding, a visible-light-curable resin was used. The obtained laminated structure was then processed with a slicing machine and reduced to target sizes. As a result of this, a retardation plate having $R0c$=20 nm, Rth=−200 nm, and a reflectance of 1% or less was obtained.

As shown in Table 5, for a sample B1 whose adhesive layer had a thickness of less than 2 μm, an area 3 mm from the edge had an interfacial peeling. For samples B2 to B6 including adhesive layers, each having a thickness of 2 μm or more, an area within 1 mm from the edge had a peeling or no peeling was observed. Therefore, it is found that providing a thickness of 2 μm or more with the adhesive layer of the retardation plate offers excellent adhesion.

Example 13

Retardation plates were produced using light-curable resins having different cure shrinkages. Thereafter, the outward appearance, for example, whether cracks were present in the support, was observed. The results of the test were shown in Table 6.

The structure of the retardation plate and the method for producing the retardation plate were described below.

A biaxially stretched norbornene-based film having a thickness of 70 μm, R0c=50 nm, and Rth=−100 nm and a biaxially stretched norbornene-based film having a thickness of 70 μm, R0c=70 nm, and Rth=−100 nm were prepared in the form of a circle as retardation films. The films were bonded together such that the optic axes of the films were orthogonal to each other so that the in-plane retardation obtained after the films were laminated was 20 nm. The measurement of the retardation was performed using RETS-100 from Otsuka Electronics Co., Ltd. For bonding the films, a visible-light-curable resin was used.

Next, two quartz glasses, each having a thickness of 0.3 mm, were used as supports, and antireflection layers were formed on first faces of the two glasses. The antireflection layers were formed by sputtering. Then, a laminated structure of the laminated films was sandwiched between the supports on which the antireflection layers were formed, and they were bonded together. For bonding, a visible-light-curable resin was used. The obtained laminated structure was then processed with a slicing machine and reduced to target sizes. As a result of this, a retardation plate having R0c=20 nm, Rth=−200 nm, and a reflectance of 1% or less was obtained.

As shown in Table 6, for a sample C1 whose cure shrinkage exceeded 10%, cracks in the support were observed, irrespective of whether the curing rate was low or high. For samples C2 to C5 whose cure shrinkages were 10% or less, when the curing rate was relatively low (10 min.), no cracks were observed in the support, but for the samples C2 and C3, when the curing rate was relatively high (1 min.), the presence of cracks in the support was observed. Therefore, it is found that for an adhesive having a cure shrinkage of 8 to 10%, a low curing rate is effective, and an adhesive having a cure shrinkage of 8% or less can provide stable adhesion regardless of the curing rate.

As describe above, according to the present invention, the contrast of the liquid crystal panel can be adjusted readily.

While the present invention has been described by reference to specific embodiments and examples, it should be understood that the present invention is not limited thereto and various modifications may be constructed on the technical idea of the present invention.

For example, in the above embodiments, as a liquid crystal display device employed in a projection image display apparatus, a reflective liquid crystal display device is described by way of example, but the present invention is not limited thereto. The present invention is applicable to a transmissive liquid crystal display device.

The optical system of the projection image display apparatus is not limited to a three-panel type, and a single-panel type may be used. The present invention is applicable to a direct-view liquid display device.

TABLE 1

| In-plane Non-uniformity(nm) | Contrast Evaluation |
|---|---|
| ±0.5 | ○ |
| ±1 | ○ |
| ±2 | ○ |
| ±3 | X |

TABLE 2

| Vertical Non-uniformity(nm) | Contrast Evaluation |
|---|---|
| ±5 | ○ |
| ±10 | ○ |
| ±20 | X |
| ±30 | X |

TABLE 3

| | Re25° C.(nm) | Re80° C.(nm) | Contrast Evaluation |
|---|---|---|---|
| Adhesive 1 | 12.2 | 12.5 | ○ |
| Adhesive 2 | 12 | 15.5 | X |

TABLE 4

| | Light-curable Resin Tg point(° C.) | Change in Retardation at Central Portion(nm) | Change in Retardation at Corner Portion(nm) |
|---|---|---|---|
| Sample A1 | 40 | 1.2 | 3.1 |
| Sample A2 | 45 | 0.7 | 1.3 |
| Sample A3 | 50 | 0.3 | 1.0 |
| Sample A4 | 55 | 0.2 | 0.4 |
| Sample A5 | 60 | 0.1 | 0.3 |
| Sample A6 | 80 | 0.1 | 0.1 |

TABLE 5

| | Thickness of Adhesive Layer(μm) | 60° C., 90% RH, for 5 days |
|---|---|---|
| Sample B1 | 1.5 | Peeled 3 mm from edge |
| Sample B2 | 2.0 | Peeled within 1 mm from edge |
| Sample B3 | 3.0 | No peel |
| Sample B4 | 5.0 | No peel |
| Sample B5 | 10.0 | No peel |
| Sample B6 | 30.0 | No peel |

TABLE 6

| | Cure Shrinkage(%) | Curing Rate(min) | Presence of Crack in Quartz |
|---|---|---|---|
| Sample C1 | 10.2 | 1 | Yes |
| Sample C1 | 10.2 | 10 | Yes |
| Sample C2 | 9.5 | 1 | Yes |
| Sample C2 | 9.5 | 10 | No |
| Sample C3 | 8.3 | 1 | Yes |
| Sample C3 | 8.3 | 10 | No |
| Sample C4 | 7.5 | 1 | No |
| Sample C5 | 5.5 | 1 | No |

What is claimed is:

1. A retardation compensating plate to compensate residual retardation of a liquid crystal panel, comprising:
    a laminated structure of more than two polymeric retardation films adhered together, the retardation plate having birefringence and an in-plane retardation (R0c) of the retardation compensating plate and an in-plane retardation (R0p) of the liquid crystal panel satisfying a relationship of $2 \leq R0c/R0p \leq 10$.

2. The retardation compensating plate according to claim 1, comprising:
   a transparent support having isotropy; and
   a birefringence layer disposed on the transparent support.

3. The retardation compensating plate according to claim 2, wherein an in-plane retardation of the birefringence layer is more than 0 nm and 30 nm or less.

4. The retardation compensating plate according to claim 3, wherein the birefringence layer is constructed of a laminated structure of two or more retardation films, and an in-plane optic axis of at least one of the retardation films is combined in a different direction with respect to the other retardation films.

5. The retardation compensating plate according to claim 4, wherein the birefringence layer is constructed by laminating retardation films having different in-plane retardations in directions in which optic axes of the retardation films are orthogonal to each other.

6. The retardation compensating plate according to claim 5, wherein each of the retardation films is a biaxially stretched film.

7. The retardation compensating plate according to claim 2, wherein the birefringence layer has negative vertical retardation.

8. The retardation compensating plate according to claim 4, wherein each of the retardation films is a polymeric film.

9. The retardation compensating plate according to claim 8, wherein a glass transition point of each of the retardation films is 160° C. or higher.

10. The retardation compensating plate according to claim 8, wherein each of the retardation films is a norbornene-based resin film.

11. The retardation compensating plate according to claim 4, wherein the retardation films are fused together using a solvent containing at least one of toluene, methyl ethyl ketone, methyl isobutyl ketone, acetone, cyclohexane, xylene, and ethyl ether.

12. The retardation compensating plate according to claim 4, wherein the retardation films are bonded together using any one of a pressure-sensitive adhesive, a light-curable adhesive, and a thermosetting adhesive.

13. The retardation compensating plate according to claim 12, wherein the adhesive has a glass transition point of 50° C. or higher.

14. The retardation compensating plate according to claim 12, wherein a thickness of an adhesive layer between the retardation films is 2 μm or more.

15. The retardation compensating plate according to claim 12, wherein a cure shrinkage of the adhesive is 10% or less.

16. The retardation compensating plate according to claim 12, wherein the number of the retardation films is two or more, and the retardation films and the transparent support are laminated using the same kind of adhesive for between the retardation films and between the retardation film and the transparent support.

17. The retardation compensating plate according to claim 1, comprising an antireflection film disposed on at least one of both main planes of the retardation compensating plate.

18. The retardation compensating plate according to claim 1, wherein $5 \leq R0c/R0p \leq 8$.

19. A retardation compensator to compensate residual retardation of a liquid crystal panel, the retardation compensator comprising:
   a retardation compensating plate having birefringence, the retardation compensating plate constructed of a laminated structure of more than two polymeric retardation films adhered together and an in-plane retardation ($R0c$) of the retardation compensating plate and an in-plane retardation ($R0p$) of the liquid crystal panel satisfying a relationship of $2 \leq R0c/R0p \leq 10$.

20. A retardation compensator comprising:
   rotating means for rotating a retardation compensating plate about an axis perpendicular to a liquid crystal panel, the axis acting as a rotation axis, the retardation compensating plate constructed of a laminated structure of more than two polymeric retardation films adhered together, and an in-plane retardation ($R0c$) of the retardation compensating plate and an in-plane retardation ($R0p$) of the liquid crystal panel satisfying a relationship of $2 \leq R0c/R0p \leq 10$.

21. The retardation compensator according to claim 20, wherein a range of an angle of rotation of the retardation compensating plate is ±10 degrees or less.

22. A liquid crystal display device comprising:
   a liquid crystal panel and a retardation compensator, the liquid crystal panel controlling transmitted light, the retardation compensator disposed on the liquid crystal panel and including a retardation compensating plate having birefringence,
   wherein the retardation compensating plate is constructed of a laminated structure of more than two polymeric retardation films adhered together, and an in-plane retardation ($R0c$) of the retardation compensating plate and an in-plane retardation ($R0p$) of the liquid crystal panel satisfies a relationship of $2 \leq R0c/R0p \leq 10$.

23. The liquid crystal display device according to claim 22, wherein an angle between a slow axis of the retardation compensating plate and a slow axis of the liquid crystal panel is from 45 to 85 degrees.

24. The liquid crystal display device according to claim 22, wherein the retardation compensator further includes rotating means for rotating the retardation compensating plate about an axis perpendicular to the liquid crystal panel, the axis acting as a rotation axis.

25. The liquid crystal display device according to claim 22, wherein the retardation compensator is fixed to the liquid crystal panel via a sealing member.

26. The liquid crystal display device according to claim 22, wherein the liquid crystal panel includes a reflective liquid crystal display element.

27. The liquid crystal display device according to claim 22, wherein the liquid crystal panel includes a homeotropic liquid crystal display element.

28. A projection image display apparatus comprising:
   a light source for emitting light-source light;
   a polarization-separating element for performing polarization separation on the light-source light;
   a liquid crystal panel for modulating the light-source light subjected to the polarization separation and forming image light;
   a screen for displaying the image light; and
   a projection lens for projecting the image light onto the screen,
   wherein a retardation compensator including a retardation compensating plate having birefringence is disposed on the liquid crystal panel, the retardation compensating plate constructed of a laminated structure of more than two polymeric retardation films adhered together, and an in-plane retardation ($R0c$) of the retardation compensating plate and an in-plane retardation (R0$p$) of the liquid crystal panel satisfying a relationship of 2<R0$c$/R0$p$≦10.

29. The projection image display apparatus according to claim 28, further comprising a separation optical system for separating the light-source light into light components corresponding to three primary colors, wherein the liquid crystal panel and the retardation compensator are disposed for each separated color light component.

30. The projection image display apparatus according to claim 28, wherein the polarization-separating element is a wire-grid polarizer.

* * * * *